United States Patent
Pyle

(10) Patent No.: US 11,746,031 B2
(45) Date of Patent: *Sep. 5, 2023

(54) WATER PURIFICATION SYSTEM

(71) Applicant: Waterfleet, LLC, San Antonio, TX (US)

(72) Inventor: Alan R. Pyle, San Antonio, TX (US)

(73) Assignee: Waterfleet, LLC, San Antonio, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/140,881

(22) Filed: Jan. 4, 2021

(65) Prior Publication Data

US 2021/0122655 A1 Apr. 29, 2021

Related U.S. Application Data

(63) Continuation of application No. 16/455,383, filed on Jun. 27, 2019, now Pat. No. 10,882,773, which is a
(Continued)

(51) Int. Cl.
*C02F 1/00* (2006.01)
*C02F 1/28* (2006.01)
(Continued)

(52) U.S. Cl.
CPC ............. *C02F 9/00* (2013.01); *C02F 1/008* (2013.01); *C02F 1/001* (2013.01); *C02F 1/283* (2013.01);
(Continued)

(58) Field of Classification Search
CPC ............ C02F 9/00; C02F 1/001; C02F 1/441; C02F 1/72
See application file for complete search history.

(56) References Cited

U.S. PATENT DOCUMENTS 3,353,593 A 11/1967 Boberg
4,724,079 A 2/1988 Sale et al.
(Continued)

FOREIGN PATENT DOCUMENTS

WO WO 2012/136220 10/2012

OTHER PUBLICATIONS

General Electric Company, GE Power & Water, Water & Process Technologies, Case Study, GE Provides Mobile Water Scarcity Solution for POSCO Pohang Iron and Steel in Korea (May 2011).
(Continued)

*Primary Examiner* — Bradley R Spies
(74) *Attorney, Agent, or Firm* — JONES DAY

(57) ABSTRACT

A mobile water purification system having a trailer, a pretreatment subsystem having a cyclonic separator, a filtering subsystem fluidly connected with the pretreatment subsystem, the filtering subsystem having at least one bedded filter; a reverse osmosis subsystem fluidly connected with the filtering subsystem, the reverse osmosis subsystem having a waste output and a product output; a collection tank fluidly connected with and downstream of the reverse osmosis subsystem; a distribution subsystem fluidly connected with and downstream of the collection tank; a source water inlet mounted to the exterior and fluidly connected to the pretreatment inlet, the source water inlet outside of the at-least partially enclosed space; and a discharge water outlet mounted to the plurality of sidewalls and fluidly connected to the pressure tank, the discharge water outlet having an outlet opening outside of the at least partially-enclosed space.

36 Claims, 11 Drawing Sheets

Related U.S. Application Data continuation of application No. 14/630,364, filed on Feb. 24, 2015, now abandoned.

(60) Provisional application No. 61/944,999, filed on Feb. 26, 2014, provisional application No. 61/944,542, filed on Feb. 25, 2014.

(51) Int. Cl.
    *C02F 1/44*     (2006.01)
    *C02F 9/00*     (2006.01)
    *C02F 1/38*     (2006.01)
    *C02F 1/72*     (2006.01)

(52) U.S. Cl.
CPC ............ *C02F 1/38* (2013.01); *C02F 1/441* (2013.01); *C02F 1/72* (2013.01); *C02F 2201/008* (2013.01); *C02F 2209/03* (2013.01); *C02F 2209/04* (2013.01); *C02F 2209/06* (2013.01); *C02F 2209/10* (2013.01); *C02F 2209/29* (2013.01); *C02F 2209/42* (2013.01); *C02F 2305/02* (2013.01)

(56) References Cited

U.S. PATENT DOCUMENTS

| | | | |
|---|---|---|---|
| 5,059,317 A | 10/1991 | Marius et al. | |
| 5,512,178 A | 4/1996 | Dempo | |
| 5,566,406 A | 10/1996 | Demeny et al. | |
| 8,808,537 B1* | 8/2014 | Livingston | B01D 61/18 210/260 |
| 2004/0262206 A1* | 12/2004 | Gettman | B01D 17/045 210/182 |
| 2005/0098491 A1 | 5/2005 | Carlotto | |
| 2005/0139530 A1 | 6/2005 | Heiss | |
| 2007/0138081 A1* | 6/2007 | Rice | B08B 3/00 210/257.2 |
| 2008/0093284 A1 | 4/2008 | Slough et al. | |
| 2008/0173583 A1 | 7/2008 | Boodoo et al. | |
| 2010/0292844 A1 | 11/2010 | Wolfe | |
| 2011/0257788 A1 | 10/2011 | Wiemers et al. | |
| 2012/0125851 A1* | 5/2012 | Shapiro | C02F 9/005 210/243 |
| 2013/0313191 A1 | 11/2013 | Wolfe | |
| 2014/0021115 A1* | 1/2014 | Ellegaard | C02F 9/005 210/182 |
| 2014/0048470 A1 | 2/2014 | Lalli | |

OTHER PUBLICATIONS

General Electric Company, GE Power & Water, Water & Process Technologies, Case Study, SRP in Springville, Arizona Uses GE Mobile Water to Speed Continues Steam Blows (Aug. 2010).
General Electric Company, GE Power & Water, Water & Process Technologies, Technical Paper, Economics of Long-Term Leasing of Membrane Based Water Make-up Systems (Feb. 2010).
General Electric Company, GE Power & Water, Water & Process Technologies, Case Study, Chemical Company in Northern Spain Uses Mobile Ion Exchange System to Meet Water Quality Needs Without Capital Expenditure (May 2011).
General Electric Company, GE Power & Water, Water & Process Technologies, Case Study, Build-Own Operate (BOO)/Mobile Bioethanol Polishing Solution Using Mixed Bed Resins (Sep. 2012).
General Electric Company, GE Power & Water, Water & Process Technologies, Case Study, Chemical Manufacturer Saves Production Loss Using Mobile Treatment System for Repairs (Jun. 2010).
General Electric Company, GE Power & Water, Water & Process Technologies, Case Study, Italian Power Plant Uses GE Mobile System to Remain Within Condensate Discharge Limits (Sep. 2010).
General Electric Company, GE Water & Process Technologies, Case Study, Nuclear Power Plant Relies on Mobile Treatment System for Hurricane Preparedness (Jun. 2010).
General Electric Company, GE Water & Process Technologies, Customer Benefits Sheet, Pure Water Outsourcing for Business with Pure Water Needs (2005).
General Electric Company, GE Water & Process Technologies, Fact Sheet, Pure Water Outsourcing for Businesses with Pure Water Needs (2005).
General Electric Company, GE Water & Process Technologies, Case Study, The Use of an Outsourced Mobile Reverse Osmosis System to Reclaim the Plant Effluent from a Steel Mill for Reuse in the Mill (Apr. 2009).
General Electric Company, GE Water & Process Technologies, Case Study, Capital and Service Contract for Reverse Osmosis Systems at TVA's Fossil Plants, by G. L. Bartley, Tennessee Valley Authority and W. E. Haas, GE Water & Process Technologies (May 2009).
General Electric Company, GE Power & Water, Water & Process Technologies, Customer Benefits Sheet, Ultrapure Water Emergency Services (Feb. 2010).
General Electric Company, GE Power & Water, Water & Process Technologies, Fact Sheet, Long Term Water Treatment, Contract Services Worldwide (Apr. 2011).
General Electric Company, GE Power & Water, Water & Process Technologies, Case Study, Walkerton Interim Water Treatment Facility (Jun. 2010).
General Electric Company, GE Water & Process Technologies, Sustainability Playbook—Reaching Significant Water Savings (May 2008).
General Electric Company, GE Power & Water, Water & Process Technologies, Case Study, De-Oxygenation of Boiler Water (Apr. 2010).
General Electric Company, GE Power & Water, Water & Process Technologies, Case Study, New Water Purification Plant Through Outsourcing (Jan. 2010).
General Electric Company, GE Water & Process Technologies, Case Study, Make-Up Water Treatment by Service Contract, by William S. Miller (35th Liberty Bell Corrosion Course IV, Sep. 15-17, 1997) (Apr. 2009).
General Electric Company, GE Power & Water, Water & Process Technologies, Brochure, Water and Process Solutions for the Refining Industry (Dec. 2011).
General Electric Company, GE Power & Water, Water & Process Technologies, Brochure, Water Treatment Solutions for the Mining Industry (Apr. 2010).
General Electric Company, GE Water & Process Technologies, Case Study, Short Term TOC Reduction of Demin Water (May 2009).
General Electric Company, GE Power & Water, Water & Process Technologies, Brochure, Water and Process Solutions for the Chemical Industry (Jul. 2013).
General Electric Company, GE Water & Process Technologies, Brochure, Complete and Simple Solutions for Industrial Process Water and Wastewater Treatment (Oct. 2008).
General Electric Company, GE Power & Water, Water & Process Technologies, Case Study, Nuclear Power Plant in the United Kingdom Outsources Water Treatment to GE (May 2011 ).
General Electric Company, GE Power & Water, Water & Process Technologies, Case Study, Short-and-Long-Term Water Treatment Options Saves Paper Mill Significantly (Jul. 2013).
General Electric Company, GE Power & Water, Water & Process Technologies, Case Study, GE Supplies Power Producer with Demineralized Water to Meet Plant Demands (Jun. 2010).
General Electric Company, GE Power & Water, Water & Process Technologies, Case Study, Developing Innovative Water Solution for a Power Station (Sep. 2010).
General Electric Company, GE Power & Water, Water & Process Technologies, Case Study, Temporary Water System Reduces Commissioning Time for Power Plant in Vietnam (May 2011).
General Electric Company, GE Power & Water, Water & Process Technologies, Case Study, GE Solves Capacity Issue for High Quality Water at DuPont's Kingston Facility (Jun. 2010).

(56) References Cited

OTHER PUBLICATIONS

General Electric Company, GE Water & Process Technologies, Technical Paper on Capital vs. Service Contract for the Supply of Demineralised Water at Bradwell-On-Sea, Essex, UK (Jun. 2009).

General Electric Company, GE Power & Water, Water & Process Technologies, Case Study, Outsourcing Ultrapure Water for Electronics Wafer Production Offers Manufacturer a Practical Solution (Mar. 2010).

General Electric Company, GE Power & Water, Water & Process Technologies, Brochure, Water and Process Treatment Solutions for the Food and Beverage Industry (Dec. 2011).

General Electric Company, GE Power & Water, Water & Process Technologies, Case Study, The Use of Membrane Technology for the Production of DI Water in Remote and Environmentally Sensitive Areas (Mar. 2010).

General Electric Company, GE Power & Water, Water & Process Technologies, Case Study, Tata Chemicals Mithapur Plant Turns to GE to Solve Water Scarcity Issue and Maintain Production (Jul. 2010).

General Electric Company, GE Power & Water, Water & Process Technologies, Technical Paper, Carbon Dioxide and Dissolved Oxygen Removal From Makeup Water by Gas Transfer Membranes (Jan. 2010).

General Electric Company, GE Power & Water, Water & Process Technologies, Case Study, GE Solves Boiler Feedwater Issue at Kraton Performance Polymers (Jun. 2013).

General Electric Company, GE Power & Water, Water & Process Technologies, Fact Sheet, MobileFlow Water Treatment System (Sep. 2011).

General Electric Company, GE Power & Water, Water & Process Technologies, Fact Sheet, MobileFlow Demineraliser (Sep. 2011).

General Electric Company, GE Water & Process Technologies, Fact Sheet, MobileFlow (Apr. 2009).

General Electric Company, GE Water & Process Technologies, Case Study, Two Consecutive BOO Contracts Help RWE Reduce Emissions, Improve Efficiency at its Tilbury Power Plant (Aug. 2009).

General Electric Company, GE Power & Water, Water & Process Technologies, Case Study, Chemical Complex Achieves Earlier Start-Up by Using DEOX Process (Jun. 2010).

General Electric Company, GE Power & Water, Water & Process Technologies, Fact Sheet, DeltaFlow Process (Jul. 2011).

General Electric Company, GE Power & Water, Water & Process Technologies, Case Study, Air Cooled Condenser Commissioning (Jun. 2010).

General Electric Company, GE Power & Water, Water & Process Technologies, Technical Paper, Effective Deoxygenation by a Hybrid Process Combining Gas Transfer Membranes with Catalytic Oxygen Reduction (Apr. 2010).

General Electric Company, GE Water & Process Technologies, Fact Sheet, MobileRO Water Treatment System (2006).

General Electric Company, GE Power & Water, Water & Process Technologies, Technical Bulletin, Low Level Deoxygenation Using Gas Transfer Membranes (Mar. 2010).

General Electric Company, GE Water & Process Technologies, Fact Sheet, MultiFlow Cost-Contained Fluid Treatment to Suit Specific Needs (2006).

General Electric Company, GE Power & Water, Water & Process Technologies, Case Study, Preventing Costly Delays in Power Plant Start Ups (Jun. 2010).

General Electric Company, GE Water & Process Technologies, Technical Paper, Factors Affecting Counterflow Ion Exchange Effluent Quality (Jun. 2009).

General Electric Company, GE Power & Water, Water & Process Technologies, Brochure, Ecomagination, a GE commitment (May 2008).

General Electric Company, GE Power & Water, Water & Process Technologies, Brochure, Build-Own-Operate Services (Aug. 2011).

General Electric Company, GE Water & Process Technologies, Technical Paper, Capital vs. Service Contract and the Supply of Reverse Osmosis at the Conoco Humber Refinery, North Lincolnshire, UK (May 2009).

General Electric Company, GE Power & Water, Water & Process Technologies, Case Study, Increased Capacity for Steam Blows (Apr. 2010).

General Electric Company, GE Water & Process Technologies, Case Study, Source-1: Total Cost Reduction for the Power Industry, by Jeffrey J. Fulgham, GE Water & Process Technologies, Greg Bartley, Tennessee Valley Authority, and Robert R. McGraw, GE Water & Process Technologies (Presented at the PowerGen International Conference 1999) (Apr. 2009).

General Electric Company, GE Power & Water, Water & Process Technologies, Case Study, Plastic Production Facility in Thailand Uses a Condensate Polishing to Meet ISO Standards (May 2011).

General Electric Company, GE Water & Process Technologies, Technical Paper, Oxygen Removal by Catalyzed Carbon Beds, by William S. Miller (EPRI Condensate Polishing Workshop, Oct. 29-31, 1985, Richmond, Virginia) (Jun. 2009).

General Electric Company, GE Water & Process Technologies, Technical Paper, The Measurement of Silica, by S. P. Ellis (In-Line Instrumentation Seminar, Nov. 17-19, 1993) (Jun. 2009).

General Electric Company, GE Power & Water, Water & Process Technologies, Technical Paper, How to Meet Today's Dissolved Oxygen Specification with Degasification Membranes, by Fred Wiesler, Membrana Charlotte, Ionics (Feb. 2010).

General Electric Company, GE Power & Water, Water & Process Technologies, Fact Sheet, Patented DEOX Process (2014).

General Electric Company, GE Water & Process Technologies, Fact Sheet, Standard Resin Regeneration Services (May 2009).

General Electric Company, GE Power & Water, Water & Process Technologies, Technical Paper, Off-Site Condensate Resin Regeneration by Service Contract, by G. L. Bartley, Tennessee Valley Authority, and R. T. Taylor, GE Power & Water (Apr. 2010).

General Electric Company, GE Power & Water, Water & Process Technologies, Fact Sheet, The Faces of GE (Sep. 2014).

General Electric Company, GE Power & Water, Water & Process Technologies, Technical Paper, Outsourcing Eliminates Hazardous Regenerant Chemicals at TVA (Apr. 2010).

General Electric Company, GE Power & Water, Water & Process Technologies, Customer Benefits, Custom Resin Cleaning and Regeneration Services (Jul. 2010).

General Electric Company, GE Power & Water, Water & Process Technologies, Fact Sheet, Super 700 MobileRO, Reverse Osmosis for High Flow Applications (Jul. 2010).

General Electric Company, GE Power & Water, Water & Process Technologies, Fact Sheet, Membrane Performance Agreement (MPA) (Dec. 2011).

General Electric Company, GE Power & Water, Water & Process Technologies, Technical Paper on Maintaining Storage Tank Dissolved Oxygen Levels Utilizing Gas Transfer Membranes, by W. E. Haas, Ionics, J. Heimrich, Florida Power and Light, and J. E. Stanton, Ionics (Feb. 2010).

General Electric Company, GE Power & Water, Water & Process Technologies, Technical Paper on Performance of the Ultrapure Make-Up System at Turkey Point Nuclear Power Plant, by Stephen P. Ellis, Laboratory Manager, Ionics, and Richard Steinke, Florida Power and Light Co., Turkey Point Nuclear Plant (Case Study presented at Epri Workshop on Condensate Polishing and Water Purification in the Steam Cycle, Mar. 20-22, 1995, Seattle, Washington (Mar. 2010).

General Electric Company, GE Power & Water, Water & Process Technologies, Brochure: Use. Recover. Repeat. Innovative equipment solutions (2012).

General Electric Company, GE Power & Water, Water & Process Technologies, Customer Benefits, Monitor Service (May 2013).

General Electric Company, GE Power & Water, Water & Process Technologies, Fact Sheet, Monitor Service (May 2013).

General Electric Company, GE Power & Water, Water & Process Technologies, Fact Sheet, Trend Service (Mar. 2014).

(56) References Cited

OTHER PUBLICATIONS

General Electric Company, GE Power & Water, Water & Process Technologies, Brochure: Precious Resources, Pressing Challenges, Clearer Solutions (2010).
General Electric Company, GE Power & Water, Water & Process Technologies, Customer Benefits Sheet, Global Field Services (Jun. 2010).
General Electric Company, GE Power & Water, Water & Process Technologies, Brochure for GE Mobile Water Solutions (Aug. 2011).
General Electric Company, GE Power & Water, Water & Process Technologies, Fact Sheet for Mobile Combination Unit, Prefiltration/RO/Polishing Unit for "Low Flow" Applications (Jul. 2010).
General Electric Company, GE Water & Process Technologies, Fact Sheet for Mobile Combination Trailer, Prefiltration and Reverse Osmosis for Low Flow Applications (Apr. 2009).
General Electric Company, GE Power & Water, Water & Process Technologies, Fact Sheet for Emergency Service, Mobile Water Services (Apr. 2011).
General Electric Company, GE Water & Process Technologies, Fact Sheet for Mobile RO Trailer (2005).
General Electric Company, GE Power & Water, Water & Process Technologies, Case Study, Mobile Water System Improves Consumer Product (Jun. 2010).
General Electric Company, GE Power & Water, Water & Process Technologies, Fact Sheet for Supplemental Service, Mobile Water Services (Apr. 2011).
General Electric Company, GE Water & Process Technologies, Fact Sheet for ZeeWeed Mobile Water Treatment System (Mar. 2008).
General Electric Company, GE Power & Water, Water & Process Technologies, Customer Benefits Sheet for Mobile Water for the Pulp & Paper Industry—The Right Water at the Right Time at the Right Place (May 2011).
General Electric Company, GE Water & Process Technologies, Fact Sheet for Mobile E-Cell Trailer (2005).
General Electric Company, GE Water & Process Technologies, Fact Sheet for Mobile Membrane Microfiltration System (Aug. 2007).
General Electric Company, GE Water & Process Technologies, Fact Sheet for Mobile Multi-Media Filtration Trailer, Pretreatment for RO System (2005).
General Electric Company, GE Power & Water, Water & Process Technologies, Case Study for Auto Assembly Plant Improves Production by Using a Mobile Water Treatment System (Jun. 2010).
General Electric Company, GE Power & Water, Water & Process Technologies, Case Study for Emergency Mobile Water Treatment Units Enable Petrochemical Plant to Commission on Time (Jan. 2013).
General Electric Company, GE Water & Process Technologies, Case Study for Refinery Meets Immediate Potable Water Needs with a GE Mobile Solution (Mar. 2009).
General Electric Company, GE Water & Process Technologies, Technical Paper on Understanding Ion-Exchange Resins for Water Treatment Systems, by W.S. Miller (Jun. 2009).
General Electric Company, GE Power & Water, Water & Process Technologies, Case Study, CT Peaking Plant Uses Mobile Water System for Operating Savings (May 2010).
General Electric Company, GE Power & Water, Water & Process Technologies, Case Study, Mobile Water System Used by Progress Energy to Meet Power Demands (May 2011).
General Electric Company, GE Power & Water, Water & Process Technologies, Fact Sheet for M-Pak Mobile Filtration System—Pressurized UF for Water Applications (Dec. 2012).
General Electric Company, GE Power & Water, Water & Process Technologies, Case Study, Power Plant in England Solves Short-Term Water Need with GE Emergency Mobile Water (May 2011).
General Electric Company, GE Power & Water, Water & Process Technologies, Case Study, Mobile Cooling Speeds Recovery at Canadian Refinery (May 2011).
General Electric Company, GE Power & Water, Water & Process Technologies, Case Study, Mobile Cooling Provides Production Boost at Paper Plant (May 2011).
General Electric Company, GE Power & Water, Water & Process Technologies, Case Study, Power Plant in the Outback Solves Scarcity Issue with GE Mobile Water System (Jul. 2010).
Omni Water Solutions website, www.omniwatersolutions.com (website no longer active, printouts from Internet Archive i.e., the "Wayback Machine") dated prior to Feb. 25, 2014 submitted herewith.

\* cited by examiner

WATER PURIFICATION SYSTEM

CROSS REFERENCES TO RELATED APPLICATIONS

This application is a continuation of U.S. application Ser. No. 16/455,383, filed Jun. 27, 2019, which is further a continuation of U.S. application Ser. No. 14/630,364, filed Feb. 24, 2015, now abandoned, and which further claims the benefit of priority from both U.S. Provisional Application No. 61/944,542, filed Feb. 25, 2014, and U.S. Provisional Application No. 61/944,999, filed Feb. 26, 2014. All of the foregoing related applications, in their entirety, are incorporated herein by reference.

FEDERALLY-SPONSORED RESEARCH

Not applicable.

BACKGROUND OF THE INVENTION

1. Field of the Invention

The present invention relates to water purification. More specifically, the present invention relates to a water purification unit that creates potable water from non-potable water.

2. Description of the Related Art

The recent increased production of hydrocarbons from new hydrocarbon plays has a seen a corresponding increase in personnel relocating to remote areas that don't have a traditional municipal water system. The personnel typically reside in makeshift housing encampments that provide the necessities of living in a remote location, such as lodging, food, communal areas, laundry services, and the like.

Chief among the needs for such makeshift housing is clean water for drinking and showering. Often, the encampment water "systems" consist of trucking in water and offloading the water to an open tank positioned near the encampment. This, however, exposes the water supply to risk of contamination at any number of points along the way, such as during transfer to the truck at the origin, transfer from the trunk at the encampment, or even exposure in the tank to outside elements. Often, fear of contaminants in the tank leaves camp personnel afraid to use the water or to overly chlorinate the supply, which can lead to other problems, such as hygiene issues, dehydration, or chlorine burns.

Moreover, contaminants or chlorine in the system limits use of the system. For example, regulations require most work locations that have dangerous chemicals to have an emergency eye wash station that use potable water. But if the trucked-in water is stored in an open tank, the water is, by definition, not potable. And if an emergency eye-wash system uses overly-chlorinated water, it may cause harm to the users.

BRIEF SUMMARY OF THE INVENTION

The water treatment system of the present invention processes non-potable source water to convert it into potable output water. In its preferred embodiment, the water treatment systems is able to process source water containing up to 3000 ppm total dissolved solids, as well as bacteria, iron, sulfur, sand, silt, and other typical ground water or well water contaminants. After it is processed, the non-potable source water is converted into US EPA quality drinking/potable water that is safe for human contact and consumption, and can be delivered to the population for use in all human contact needs.

The water treatment system is contained within a 10,400-pound gross vehicle weight rated (GVWR) cargo trailer or similar-sized trailer with an enclosed environment. An external/internal transfer station is incorporated on one side of the trailer. This station contains four connections: source water inlet connection; discharge water outlet connection; auxiliary product outlet connection; primary product outlet connection.

Several features are mounted on the exterior of the trailer. An external eye wash and a safety shower are mounted on one side of the trailer, both of which are connected to and fed by the product water supply. A container filling station is mounted on one side of the trailer which is also connected to and fed by the product water supply. Also fed by the product water is an ice delivery chute that is mounted on one side of the trailer. This chute allows access to the ice delivery point and directs the ice to a point of delivery outside of the trailer. Electrical panels for the required service to the trailer are mounted on the external surface of the trailer. These panels allow for power connection, and provide circuit breaker protection for the trailer operation.

The system incorporates piping and connections sufficient to connect the trailer to external delivery points. Half-inch piping is utilized with quick connects on each pipe. This allows for rapid deployment of the piping to the connection points. Tee's and elbows with quick connect fittings are available to place in line at the appropriate points. Three-quarter inch flexible hoses connect to the tees and elbows for final connection to the delivery point.

The system includes hose lengths and connections for the source water supply and discharge water delivery to external points. The system includes hose length and connections to provide the product water supply to remote tanks and delivery points via the auxiliary connection point.

In use, the trailer is towed to a desired site location and the water treatment system is connected for use. The non-potable source water supply is connected for input into the water treatment system and the output of the system is connected to the delivery location of the converted water. Additionally, electrical service is connected to the electrical panel to power the water treatment system inside the enclosed, climate controlled environment on the trailer. Within the climate controlled environment a series of filters, pumps, mixing tanks, and other equipment make up the water treatment system, as discussed in detail below. Additionally, an onboard control system controls and monitors the water treatment system as it processes the water. The onboard computer periodically samples the water and compares pressure readings at various points within the system to ensure proper operation, with operating parameters programmed into the onboard computer to define when the system is not operating properly. When a point in the system falls outside an operating parameter the onboard computer issues visual and audible warnings and, depending on the severity, may shut down the system entirely.

The onboard control system is in communication with computers that are remote to the trailer, allowing the water treatment system to be monitored and controlled from an offsite location. Offsite control allows for routine maintenance procedures to be achieved without making a service trip to the unit. For example, certain filters within the system can be flushed and cleaned if the system falls out of a desired operating parameter, with the flushing and cleaning process being directed from the offsite computer communicating with the onboard computer.

The mobile water purification unit may be used in a variety of applications, regardless of the geographic location and external climate. In cold locations, the climate controlled environment prevents treated water stored within the trailer from freezing and in hot locations prevents the water from becoming undesirably warm. Additionally, the climate-controlled environment maintains a constant temperature within the trailer to prevent temperature fluctuations that may cause damaging condensation, and provides a suitable operating temperature for the components within the trailer. The climate temperature within the enclosed environment is monitored by the onboard control system.

One of example of where the mobile water purification unit may be used is to supply and deliver potable water to temporary housing in oil and natural gas drilling operations. As another example, it may be used as part of natural disaster relief efforts, where potable water is in limited supply.

DETAILED DESCRIPTION

Figure 1A:
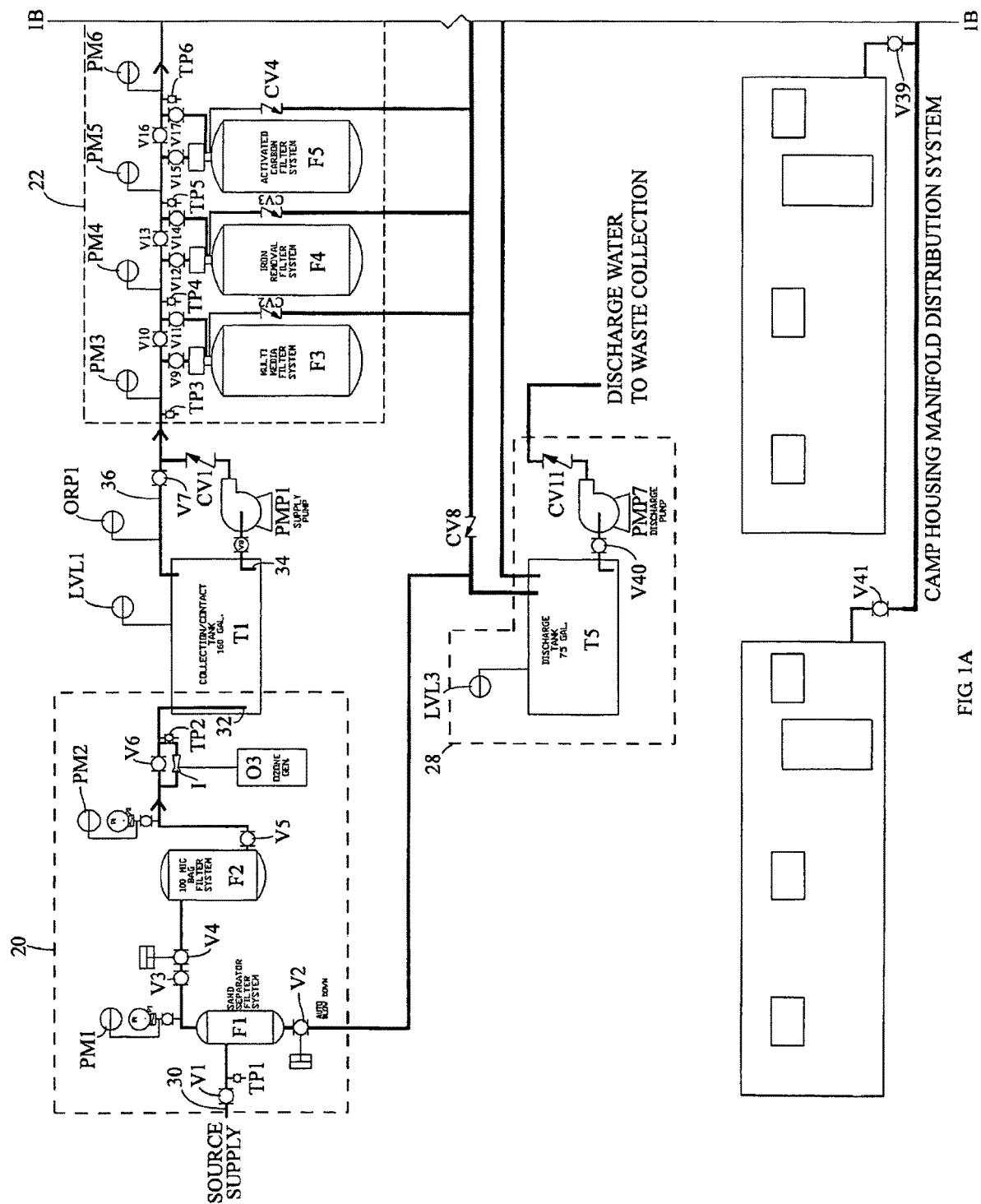
FIG. 1, which consists of FIGS. 1A-1B, shows a system diagram of an embodiment of the invention.
Figure 1B:
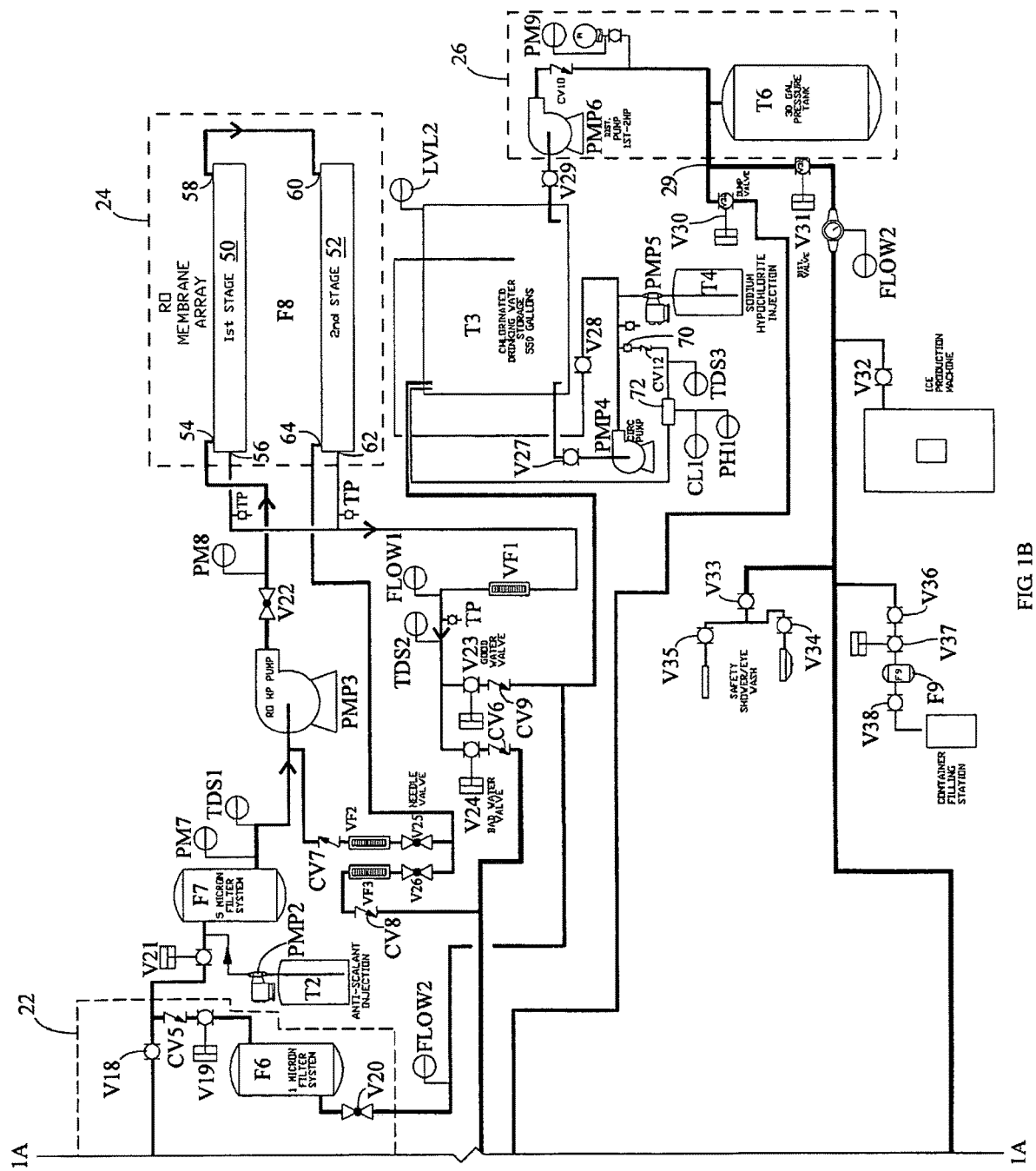

Referring to FIG. 1, which consists of FIGS. 1A-1B, the embodiment comprises a pretreatment subsystem 20, a filtering subsystem 22, a reverse-osmosis (RO) subsystem 24, a distribution subsystem 26, and a discharge subsystem 28. The pretreatment subsystem 20 is fluidly connected to a water source (not shown). The filtering subsystem 22 is downstream of the pretreatment subsystem 20. The RO subsystem 24 is downstream of the filtering subsystem 22. The distribution subsystem 26, which is downstream of the RO subsystem 24, incudes tank T3 and provides output for use with a fluid line 29. The discharge subsystem 28 is fluidly connected to each of the other subsystems.

Pretreatment Processing

The pretreatment subsystem 20 includes an inlet 30, an outlet 32, a sand separator filter F1, a filter F2, and an ozone generator O3. The inlet 30 is in selective fluid communication with the sand separator filter F1 through a manual valve V1. In other words, when valve V1 is open, a fluid communication path extends between the inlet to and the sand separator F1. A system control system, such as a programmable logic device or microcontrol system, is electronically connected to various elements of the system to receive data and activate the various valves and energize pumps. Each value described as an "actuated" valve is electronically connected to the control system.

The sand separator F1 is a hydrocyclone or similar device that uses cyclonic separation or centrifugal force to remove sand, silt, and other heavy suspended solids from the source water. The sand separator F1 is fluidly connected to a non-bedded filter, such as a 100-micron bag filter F2 or a screen filter, which removes suspended solids of a predetermined size as the water passes through.

The sand separator F1 is also connected to the discharge subsystem 28. An actuated valve V2 is interposed within the fluid line between the sand separator F1 and the discharge subsystem 28.

The pretreatment subsystem 20 also includes various manual and actuated valves. A manual valve V3 is positioned in the fluid communication path between the sand separator F1 and the bag filter F2. An actuated valve V4 is positioned between the manual valve V3 and the bag filter F2. Another manual valve V5 is positioned in the fluid line between the bag filter F2 and the outlet 32.

The pretreatment subsystem 20 also includes an injector I and a manual valve V6 parallel with the injector I. The injector I and manual valve V6 are positioned between the manual valve V5 and the outlet 32. The ozone generator O3 is connected to the fluid inlet of the injector I. The size of the motive fluid inlet of the injector I as at least as large as the size of the particulate removed by filter F2 to inhibit clogging of the injector. For example, in this embodiment, the motive fluid inlet is at least one-hundred microns.

Oxidation of the water in the pretreatment subsystem 20 reduces the organic environment (i.e., kills bacteria) and causes iron to precipitate from the water. Ozone or other oxidants may be used for the oxidation.

The pretreatment subsystem 20 includes two pressure monitors. One pressure monitor PM1 includes a probe positioned in the line between the actuated valve V4 and the filter F2. The other pressure monitor PM2 is positioned between manual valves V5 and V6.

The outlet 32 is located in a collection tank T1, preferably near the bottom of collection tank T1 and below the surface of any contained water. The collection tank T1 has a 160-gallon capacity. An analog level monitor LVL1 is operably connected to the collection tank T1. A fluid line has an opening 34 near the bottom of the tank T1 and is fluidly connected to the inlet of a supply pump PMP1. A manual valve V8 is interposed between the opening 34 and the supply pump PMP1. A check valve CV1 is fluidly connected to the outlet of supply pump PMP1.

A throttle valve V7 is connected between the collection tank T1 and the check valve CV1. A bypass line 36 extends between the outlet of the throttle valve V7 and terminates within the collection tank T1.

Filtering Subsystem

The filtering subsystem 22 is fluidly connected to the output of the check valve CV1. The filtering subsystem 22 has a multimedia (or "depth" or "bedded") filter system F3, an iron removal system F4, a carbon filter system F5, and a one-micron filter system F6. The filtering subsystem 22 is downstream of the ozone treatment because the media filters F4, F5, F6 of the filtering subsystem 22 are potential accumulation points for bacteria. Thus, it is desirable that bacteria be destroyed through ozone contact prior to the source water reaching the media filters.

The multimedia filter F3 is connected to three valves. A first manual valve V9 is connected to the inlet of the filter F3. A second manual valve V11 is connected to an outlet of the filter F3. A third valve V10 is connected between the inlet of the first manual valve V9 and the output of the second manual valve V10. In addition, a check valve CV2 is connected between a second outlet of the filter F3 and the discharge subsystem 28.

The iron removal filter F4 is connected to three valves. A first manual valve V12 is connected to the inlet of the filter F4. A second manual valve V14 is connected to an outlet of the filter F4. A third valve V13 is connected between the inlet of the first manual valve V12 and the output of the second manual valve V13. In addition, a check valve CV3 is connected between a second outlet of the filter F4 and the discharge subsystem 28.

The carbon filter F5 is connected to three valves. A first manual valve V15 is connected to the inlet of the filter F3. A second manual valve V17 is connected to an outlet of the filter F5. A third valve V16 is connected between the inlet of the first manual valve V15 and the output of the second manual valve V16. In addition, a check valve CV4 is connected between a second outlet of the filter F5 and the discharge subsystem 28. In another embodiment, the one-micron filter system F6 may be removed entirely, as further discussed below.

The one-micron filter system F6 is separated from the output of the other filters F3, F4, F5 by a manual valve V18, a check valve CV5, and an actuated valve V19. The actuated valve V19 is connected to an inlet of the one-micron filter system F6. The check valve CV5 is connected between the actuated valve V19 and the manual valve V18. The one-micron filter F6 has an outlet that is connected to a throttling valve V20 that is preferably a needle valve. The actuated valve V19 is normally closed, but is opened by the control system depending on the total dissolved solids level in a storage tank T1. A flow meter FLOW2 is connected to the fluid communication path between the throttling valve V20 and the tank T3.

The filtering subsystem 22 includes four pressure monitors and four test ports. A first pressure monitor PM3 and first test port TP3 are connected at the inlet of the subsystem 22. A second pressure monitor PM4 and second test port TP4 are connected between the manual valves V10 and V13. A third pressure monitor PM6 and third test port TP5 are connected between the manual valves V13 and V16. A fourth pressure monitor PM5 and fourth test port TP6 are connected downstream of the manual valve V16. Each test port is a three-way ball valve or other type of valve that opens the fluid path to the external atmosphere, thus allowing a sample of the fluid within the line to be drawn.

A five-micron filter system F7 is connected to the output of the filtering subsystem 22 through an actuated valve V21. A tank T2 is connected to the inlet of the filter system F7. The tank T2 contains an anti-scaling solution. A second pump PMP2 is fluidly connected to the tank T2 and the inlet of the filter F7.

RO Subsystem

An output of the filter system F7 is connected to an inlet of a high-pressure pump PMP3. A pressure monitor PM7 and total-dissolved-solids monitor TDS1 are connected to the fluid line between the filter F7 and the pump P3. The outlet of the pump PMP3 is connected to the RO subsystem 24. More specifically, the outlet of the pump PMP3 is connected to a reverse-osmosis (RO) array F8 through a throttling valve V22, which allows the operator to adjust the pressure received by the RO array F8.

As used herein, a "throttling valve" is any valve used in to control flow rate and that is never fully closed. In this embodiment, a "throttling valve" is a ball valve that is partially closed to varying degrees. Such a valve, however, could also be a gate valve or a butterfly valve.

The RO array F8 includes a first stage 50 and a second stage 52. The first stage 50 has an inlet 54, a primary outlet 56, and a secondary outlet 58. The second stage 52 has an inlet 60, a primary outlet 62, and a secondary outlet 64. The secondary outlet 54 is connected to the inlet 60 of the second stage 52. The primary outlets 56, 62 are connected to actuated valves V23, V24 through visual flow rate gauge VF1.

The output of valve V23 is fluidly connected through check valve CV9 to a storage tank T3 and to the outlet of the one-micron filter F6 through needle valve V20. The output of V24 is fluidly connected to discharge tank T5 through check valve CV6.

The secondary outlet 64 of the second stage 52 is connected to inlets of needle valves V25, V26. The output of needle valve V25 is connected to the inlet of the high-power pump PMP3 through visual flow rate gauge VF2 and check valve CV7. The outlet of needle valve V26 is connected to the discharge tank T5 through visual flow rate gauge VF3 and check valve CV8.

The pretreatment subsystem 20 is upstream of the filtration subsystem 22 because the RO membranes in the RO subsystem 24 cannot tolerate the ozone or other oxidants introduced in the pretreatment subsystem 20. The filtration subsystem 22 removes the oxidants as water passes through and removes the suspended solids that would clog or otherwise affect the RO membranes in the RO subsystem 24.

Distribution/Monitoring

The storage tank T3 has a minimum five-hundred fifty gallon capacity. A circulation pump PMP4 has an inlet fluidly connected to the tank T3 through manual valve V27 and an outlet fluidly connected to the tank T3 through manual valve V28.

A monitoring subsystem is connected to the outlet of the pump PMP4. The monitoring subsystem includes a throttle valve 70 and a check valve CV12. The monitoring subsystem also includes a total-dissolved-solids monitor TDS3, a pH monitor PH1, and a chlorine monitor CL1 connected to the output of the check valve CV12 through a monitoring block 72. The output of the monitoring subsystem is in fluid communication with the storage tank T3. A test port TP is connected to the outlet of the pump PMP4.

The distribution subsystem 26 is in selective fluid communication with the tank T3. The distribution subsystem 26 includes a pump PMP6 with an inlet in fluid communication with the tank T3 through a manual valve V29. The outlet of the pump PMP6 is fluidly connected through a check valve CV10 to a pressure tank T6, actuated valves V30, V31, and a pressure monitor PM9. The output of the actuated valve V30 is fluidly connected to the discharge tank T5. The outlet of the actuated valve V31 is connected to an ice machine through valve V32, a container filling station through valves V36, V37, and V38 and carbon filter F9, and a safety wash system through valves V33. The outlet of the tank T6 may also be connected to camp housing units through manual valves V39, V41.

A carbon filter F9 is incorporated to remove the chlorine residual just prior to filling at the filling station. This improves taste for drinking. A push button is used to activate the fill station. Sixty seconds are provided for filling a container. The push button activates the fill station solenoid valve V37. A separate manual ball valve V38 is incorporated for controlling flow.

Discharge Subsystem

A discharge pump PMP7 has an input fluidly connected to the discharge tank T5 through manual valve V40. The output of the pump PMP7 is connected to a waste collection location (not shown) through a check valve CV11.

System Operation

Initial Treatment and Collection

Source water is delivered to the system under pressure and flows into the system through the inlet 30 of the pretreatment subsystem 20. Under normal operating conditions, V1 is open to allow the source water to flow and enter the sand separator filter F1. The sand separator filter F1 cyclonically separates sand, silt, and other heavy suspended solids from the source water. The separated solids accumulate at the bottom of the filter F1. The remaining water exits the filter F1 for further processing in the system.

Accumulated solids in filter F1 occasionally need to be removed. To remove, or "blow down," the accumulated solids, the control system opens valve V2 for a certain time period, at selected time intervals, thus allowing the accumulated solids to exit. The time period valve V2 is opened (i.e., the "blow down length time") and the time interval between openings (i.e., the "blow down interval") is site specific and varies according to the concentration of sand, silt, or other heavy suspended solids in the source water at a particular site. As such, these parameters are programmable into the control system. For example, the control system may be programmed for a five second blow down length of time and a one hour blow down interval, meaning valve V2 would open for five seconds every hour.

Figure 2A:
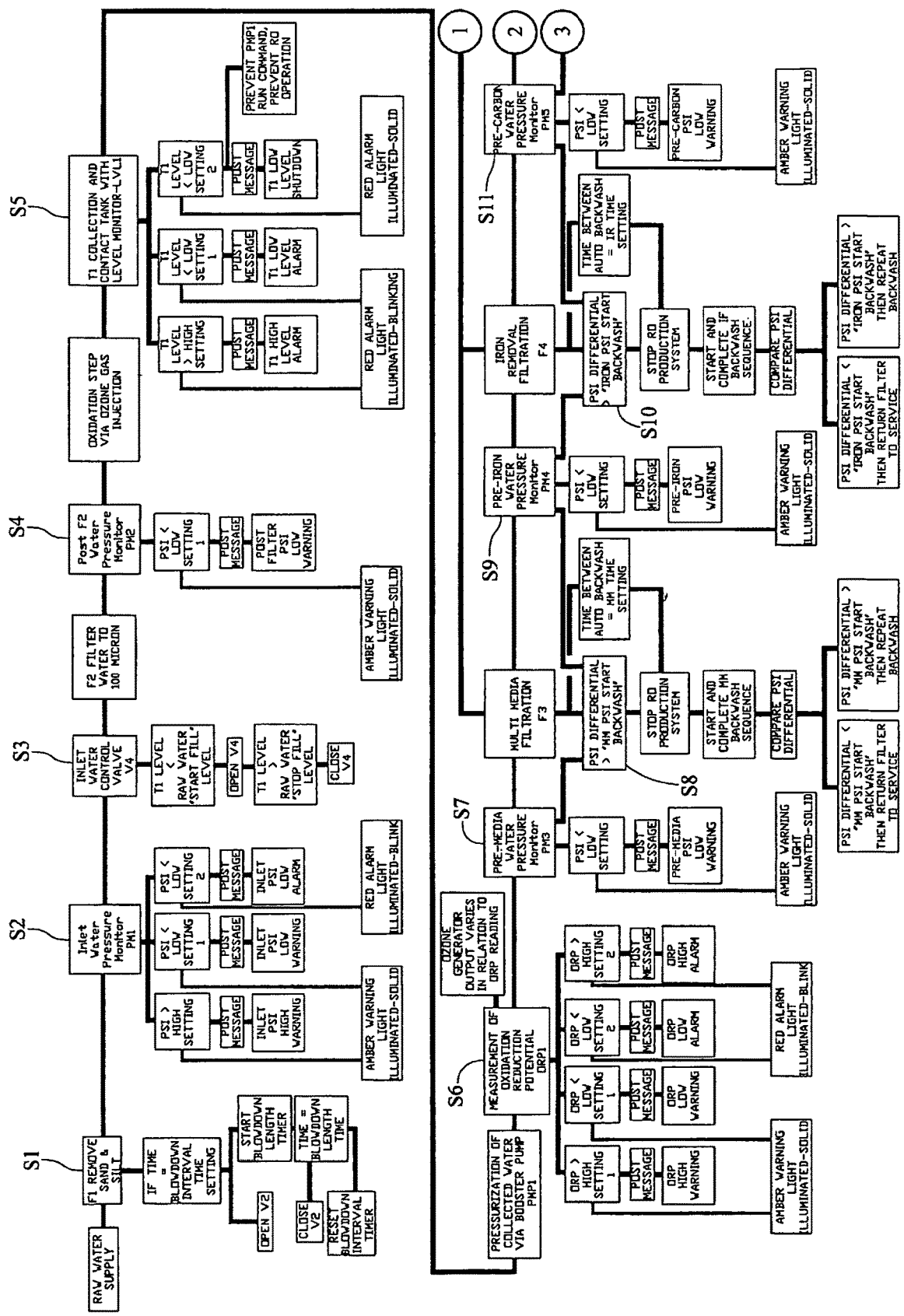
FIG. 2, which consists of FIGS. 2A-2F, is a control flow chart for the system embodiment described with reference to FIG. 1.

As shown in FIG. 2A at step S1, the blow down control for the sand separator uses two timers. The first is the blow down interval timer measures the time interval between openings of actuated valve V2. The blow down interval may be set from every one hour to every twenty-four hours depending on the makeup of the source water. The second timer measures the blow down length time and may be adjusted from a minimum time period of five seconds to a maximum time period of fifteen seconds. Waste water resulting from the blow down operation is directed to the discharge tank T5.

From the sand separator filter F1, the water flows across inlet water pressure monitor PM1. The inlet water pressure monitor PM1 determines if the inlet water pressure of the source water delivered to the system is too high or too low for safe operation. The desired inlet water pressure with no flow is 70 psi, and with flow is approximately fifty psi. As shown in FIG. 2A at step S2, a high pressure parameter and two low pressure parameters are programmed into the control system. The high pressure parameter is set based on the safe pressure limits for pipe and connections on the inlet line. The normal warning level is set at 85 psi to provide ample warning prior to the limit of 120 psi being reached. The warning level pressure can be adjusted upward or downward to fit the particular circumstances of the site where the system is installed. If the high pressure parameter is reached a warning condition is indicated by posting a message to the control system and by illumination of a solid amber light on the exterior of the trailer.

There are also two low pressure parameters programmed into the control system to ensure inlet pressure measured at PM1 is sufficient for proper operation of sand separator filter F1, passage of water through the filter F2, and proper operation of injector I. The first parameter is set at 25 psi, a level high enough to continue operations, but indicative of a dropping pressure condition that should be noted and corrected if possible. If this first low pressure parameter is reached a warning condition is indicated by posting a message to the control system and by illumination of a solid amber light on the exterior of the trailer. The second low pressure parameter is set at 20 psi, a level of pressure indicative of improper supply capacity that will result in a shortage of water for processing. If this second low pressure parameter is reached an alarm condition is indicated by posting a message to the control system and by illumination of a blinking red light on the exterior of the trailer. The system is allowed to continue running even in alarm condition, however, because the sand separation and oxidant injection are not critical control points, and downstream treatments can manage the duty for short periods.

From PM1, the water flows through valves V3 and V4. As shown in FIG. 2A at step S3, the level monitor LVL1 periodically provides data to the control system that is representative of the water level to control operation of actuated valve V4. When the minimum fluid level in tank T1 is reached, LVL1 notifies the control system and the control system sends a signal to open valve V4, thus allowing source water to flow into the system. When the maximum fluid level in tank T1 is reached, LVL1 notifies the control system and the control system sends a signal to close valve V4. The minimum and maximum fluid levels can be adjusted based on changing conditions such as water temperature, air temperature, inlet pressure, or organic load in the source water. For example, the minimum fluid level may be set so that valve V4 is opened when the fluid level in tank T1 is 100 gallons and the maximum fluid level may be set so that valve V4 closes when the fluid level in tank T1 reaches 140 gallons.

From V4, the water flows into the filter F2. As noted, filter F2 removes suspended solids of a particular size, which, in the present embodiment, are particles greater than one-hundred microns. Filtered water exits the filter F2 and migrates through the fluid communication path across pressure monitor PM2.

As shown in step S4 in FIG. 2A, the control system measures pressure at PM2 to determine whether sufficient pressure exists after water passes through filter F2. A low pressure parameter programmed into the control system indicates whether sufficient pressure exists for the injector I downstream of PM2 will operate properly. Falling below the low pressure parameter at PM2 may indicate that the filter F2 needs to be cleaned or changed. The low pressure parameter may be set to 15 psi or some other value, dependent upon the makeup of the injector I. If the pressure at PM2 falls below the low pressure parameter a warning condition is indicated by posting a message to the control system and by illumination of a solid amber light on the exterior of the trailer.

After flowing past PM2, the water proceeds into the injector I or through valve V6. As the water moves through the injector I, ozone generated by the ozone generator O3 is drawn into the water through the injector I. The parallel valve V6 may be used to adjust the flow rate through the injector I, thereby adjusting the rate of injection of O3. Once the water exits injector I or valve V6 it flows out of the outlet 32 and into the collection tank T1. Because the outlet 32 is preferably below the surface of any water already contained in the tank T1, the entrained ozone is inhibited from immediately exiting the water. In addition, positioning the outlet below the liquid surface promotes mixing of the tank contents and inhibits tank settling.

In the tank T1, the injected ozone or other oxidant kills bacteria in the water, oxidizes iron and manganese, destructs hydrogen sulfide if present, and destroys algae and other spores. Preferably, the contact time of the injected ozone and the water is at least ten minutes to ensure proper oxidation. The contact time is a primarily dependent upon the size of collection tank T1, with a 160 gallon tank T1 proving sufficient.

In tank T1, level monitor LVL1 monitors and reports the fluid level back to the control system, as shown in step S5 in FIG. 2A. A high fluid level parameter and two low fluid level parameters are programmed into the control system. The high level parameter in this embodiment is set to 155 gallons, which is five gallons less than the maximum volume of tank T1. If the high level parameter is exceeded an alarm condition is indicated by posting a message to the control system and by illumination of a blinking red light on the exterior of the trailer. The first low fluid level parameter is set for 25 gallons to provide an indication that tank T1 is nearly empty and the incoming water supply cannot meet the demand of water exiting tank T1. Falling below the first low fluid level parameter causes an alarm condition which is indicated by posting a message to the control system and by illumination of a blinking red light on the exterior of the trailer. Additionally, other alarms may occur in conjunction with this if the problem is related to a low inlet pressure at PM1 or a low post-filter F2 pressure at PM2. Together, these alarms provide quick recognition of the underlying problem related to a low tank T1. Further, rising above the first low fluid level parameter causes the control system to notify downstream subsystems to "wake up" and operate in the start-up phase of operation.

The second low fluid level parameter measured in tank T1 is one that causes shutdown of the system if reached. This parameter is set for 20 gallons, which is considered the minimum water volume for pump PMP1 to operate without cavitation. If the fluid level in tank T1 reaches the second low fluid level parameter an alarm condition is indicated by posting a message to the control system and by illumination of a solid red light on the exterior of the trailer. After receiving this message, the control system issues a command that prevents PMP1 from operating and prevents RO subsystem 24 operation.

Downstream of the collection tank T1, pump PMP1 is activated by the control system when valve V4 is opened, when the valve V21 is opened, or when a backwash sequence is started for any of the filters in the filter subsystem 22. In the case of a backwash sequence, PMP1 will supply water to the filter subsystem 22 to accomplish the backwash. If the RO subsystem 24 is running at a point when a filter in the filter subsystem 22 needs to backwash, the control system will stop the RO subsystem 24 and will continue to run pump PMP1 to supply the filter backwash need. When the backwash is complete, the control system will signal the RO subsystem 24 to continue operation and pump PMP1 will continue to run to support that operation. Also, if the collection tank T1 is still in fill mode when a backwash or RO subsystem 24 operation is complete, the pump PMP1 will continue to run until the tank T1 has filled to the shut off level.

When actuated, the supply pump PMP1 draws water from the tank T1 and delivers the water through the check valve CV1. Pump PMP1 re-pressurizes the contents of the collection tank T1 for use downstream. Pump PMP1 is sized to provide the water flow rate and pressure needed for correct operation of downstream subsystems. An expected pressure drop of 3-5 psi is expected through each filter of the filter subsystem 22 and the 5 micron filter F7. A minimum pressure following these filters is 5 psi, at the required flow rate demand of the RO subsystem 24. For a 6000 gallon per day demand, this flow rate at pump PMP1 is calculated to be two times (2×) the output, or 8.3 gallons per minute (gpm). Therefore, pump PMP1 is chosen based on its ability to provide 8.3 gpm at a minimum of 25 psi, with a safety factor of 2, or 50 psi.

From pump PMP1 water is output to the check valve CV1. From CV1, the majority of the water enters the filtering subsystem 22. Some of the water exiting CV1, however, flows through throttle valve V7, flows past the ORP monitor probe ORP1, and delivers the water back to the tank T1. Probe ORP1 provides a reading that is relative to the ozone level in the water and the oxidation that has occurred. The ORP probe ORP1 provides a constant analog reading to the control system. The control system then provides a control signal back to the ozone generator O3 to selectively introduce more ozone into the water stream if necessary. This automatically maintains the desired reading for the water in the collection tank T1 that relates to bacteria, iron, manganese and sulfide oxidation. If the oxidation reduction potential reading drops below operator-set level, the system will provide a warning or alarm.

A desired ORP reading is 500 mv, which indicates that the water has a strong oxidation potential. This indicates the components consuming oxygen are no longer present, meaning the organic load has been destroyed. High and low parameters are defined to provide warnings and alarms on either side of this preferred reading, as shown in step S6 in FIG. 2A. These parameters are as follows:

High Level Warning (high setting 1): This parameter is set for 1000 my, which is 20% less than the maximum desired ORP reading. When this parameter is exceeded a warning condition is indicated by posting a message to the control system and by illumination of a solid amber light on the exterior of the trailer.

High Level Alarm (high setting 2): This parameter is set for 1250 my, which is the maximum desired ORP reading. Readings above this level may cause long term damage to the downstream filtration units. When this parameter is exceeded an alarm condition is indicated by posting a message to the control system and by illumination of a blinking red light on the exterior of the trailer. Because the system can still function for short periods of time with ORP levels this high, a shutdown is not required, however the alarm condition requires acknowledgement and reset to turn off the alarm, thus ensuring an operator has noted the problem.

Low Level Warning (low setting 1): This parameter is set for 100 mv. This level is an indication that the ozone oxidation may not be able to keep up with the organic load in the source water, either due to excessive load, or malfunction of the ozone generator. When this parameter is reached a warning condition is indicated by posting a message to the control system and by illumination of a solid amber light on the exterior of the trailer.

Low Level Alarm (low setting 2): This parameter is set for 50 mv. This level is an indication that the ozone generator is unable to provide sufficient ozone gas, or that the ozone generator is no longer functioning. When this level is reached, an alarm condition is indicated by posting a message to the control system and by illumination of a blinking red light on the exterior of the trailer. Because the system can still function for short periods of time with ORP levels this low, a shutdown is not required, however the alarm condition requires acknowledgement and reset to turn off the alarm, thus ensuring an operator has noted the problem.

Pre-RO Filtration

Water flowing from PMP1 toward the filtering subsystem 22 flows across pressure monitor PM3, which determines if the water pressure entering the filtering subsystem 22 is sufficient for proper operation. The desired water pressure with no flow is 70 psi, and with flow is approximately 50 psi. As shown by step S7 in FIG. 2A, a low pressure warning parameter is programmed into the control system. In this embodiment the low pressure warning parameter is 20 psi. If the low pressure warning parameter is reached a warning condition is indicated by posting a message to the control system and by illumination of a solid amber light on the exterior of the trailer. Further, the control system instructs PM3 to disregard the pressure reading during backwash operations.

Under normal operating conditions, valve V10 is closed while valves V9, V11 are open. Thus, after entering the filtering subsystem 22, water moves through the multimedia filter system F3, which removes suspended solids in the water larger than twenty-five microns. Sometimes referred to as a depth filter, the filter F3 is comprised of layers of different types of media positioned so that the most porous medium is above the next most porous medium, and so forth, until the least porous medium is at the bottom of the filter F3.

During operation, the control system calculates the pressure differential between pressure monitor PM3 and pressure monitor PM4, as shown by step S8 in FIG. 2A to determine if the multi-media filter F3 has reached a maximum capacity. In the event that the differential pressure equals or exceeds a set psi, or a set time has elapsed, a backwash sequence will commence. The parameters involved are as follows:

PSI Differential: Normal setting for maximum differential allowed is 10 psi. When this differential is reached, the control system stops the RO subsystem 24 and starts the backwash sequence for filter F3. Upon completion of the sequence, the control system will allow the RO subsystem 24 to operate again, and then compare the differential. If the differential is less than 10 psi, the control system allows normal operations to resume. If the differential it greater than or equal to 10 psi, the control system repeats the backwash sequence.

Time Elapsed: Normal setting for maximum time elapsed between backwash is 60 hours. When this time is reached, the control system stops the RO subsystem 24 and starts the backwash sequence for filter F3. Upon completion of the backwash sequence, the control system resets the time clock and allows normal operations to resume.

Pressure monitor PM4 also determines if the water pressure entering filter F4 is sufficient for proper operation. The desired water pressure with no flow is 70 psi, and with flow is approximately 45 psi. As shown by step S9 in FIG. 2A, a low pressure warning parameter is programmed into the control system. In this embodiment the low pressure warning parameter is 20 psi. If the low pressure warning parameter is reached a warning condition is indicated by posting a message to the control system and by illumination of a solid amber light on the exterior of the trailer. Further, the control system instructs PM4 to disregard the pressure reading during backwash operations.

Under normal operating conditions, valve V13 is closed while valves V12, V14 are open. Thus, after exiting the filter F3, the water moves through the iron removal filter F4, which removes iron and manganese in the water to levels that are safe for reverse-osmosis processing. Iron can be suspended in extremely small size (e.g., sub-micron). The ozone injection previously discussed causes dissolved iron to precipitate but to the extent any iron remains, it will be filtered to the twenty-five micron threshold by the multimedia filter F3 and then will be removed by the iron filter F4, which uses an earthy medium with a high affinity to suspended or dissolved iron.

Downstream of filter F4, the water flows past pressure monitor PM5 where the water pressure is measured. During operation, the control system calculates the pressure differential between pressure monitor PM4 and pressure monitor PM5, as shown by step S10 in FIG. 2A to determine if the iron removal filter F3 has reached a maximum capacity. In the event that the differential pressure equals or exceeds a set psi, or a set time has elapsed, a backwash sequence will commence. The parameters involved are as follows:

PSI Differential: Normal setting for maximum differential allowed is 10 psi. When this differential is reached, the control system stops the RO subsystem 24 and starts the backwash sequence for filter F4. Upon completion of the sequence, the control system will allow the RO subsystem 24 to operate again, and then compare the differential. If the differential is less than 10 psi, the control system allows normal operations to resume. If the differential it greater than or equal to 10 psi, the control system repeats the backwash sequence.

Time Elapsed: Normal setting for maximum time elapsed between backwash is 60 hours. When this time is reached, the control system stops the RO subsystem 24 and starts the backwash sequence for filter F4. Upon completion of the backwash sequence, the control system resets the time clock and allows normal operations to resume Pressure monitor PM5 also determines if the water pressure entering filter F5 is sufficient for proper operation. The desired water pressure with no flow is 70 psi, and with flow is approximately 40 psi. As shown by step S11 in FIG. 2A, a low pressure warning parameter is programmed into the control system. In this embodiment the low pressure warning parameter is 20 psi. If the low pressure warning parameter is reached a warning condition is indicated by posting a message to the control system and by illumination of a solid amber light on the exterior of the trailer. Further, the control system instructs PM5 to disregard the pressure reading during backwash operations.

Under normal operating conditions, valve V16 is closed while valves V15, V17 are open. Thus, after exiting the filter F4, the water moves through the granular activated carbon filter F5, which removes organic carbon, color, odor, and certain solvents present in the water. Granular activated carbon has a high affinity to oxidants, include chlorine and ozone.

Downstream of filter F5, the water flows past pressure monitor PM6 where the water pressure is measured. During operation, the control system calculates the pressure differential between pressure monitor PM5 and pressure monitor PM6, as shown by step S12 in FIG. 2B to determine if the carbon filter F5 has reached a maximum capacity. In the event that the differential pressure equals or exceeds a set psi, or a set time has elapsed, a backwash sequence will commence. The parameters involved are as follows.

PSI Differential: Normal setting for maximum differential allowed is 10 psi. When this differential is reached, the control system stops the RO subsystem 24 and starts the backwash sequence for filter F5. Upon completion of the sequence, the control system will allow the RO subsystem 24 to operate again, and then compare the differential. If the differential is less than 10 psi, the control system allows normal operations to resume. If the differential it greater than or equal to 10 psi, the control system repeats the backwash sequence.

Time Elapsed: Normal setting for maximum time elapsed between backwash is 60 hours. When this time is reached, the control system stops the RO subsystem 24 and starts the backwash sequence for filter F5. Upon completion of the backwash sequence, the control system resets the time clock and allows normal operations to resume Pressure monitor PM6 also determines if the water pressure entering filter F7 is sufficient for proper operation. The desired water pressure with no flow is 70 psi, and with flow is approximately 35 psi. As shown by step S13 in FIG. 2A, a low pressure warning parameter is programmed into the control system. In this embodiment the low pressure warning parameter is 20 psi. If the low pressure warning parameter is reached a warning condition is indicated by posting a message to the control system and by illumination of a solid amber light on the exterior of the trailer. Further, the control system instructs PM6 to disregard the pressure reading during backwash operations.

Each of the filters F3, F4, F5 in the filtering subsystem 22 may be bypassed. Filter F3 may be bypassed by closing valves V9, V11 and opening valve V10. Filter F4 may be bypassed by closing valves V12, V14 and opening valve V13. Filter F5 may be bypassed by closing valves V15, V17 and opening valve V16. Bypassing these valves may become necessary for repair operations or for other reasons.

As noted, each filter has an analog transmitting pressure sensor (PM3, PM4, PM5, and PM6, respectively) that monitors the water pressure before and after the filter. Data representative of the pressure at each monitor's probe is provided to the control system. The pressure differential between the two sensors is calculated by the control system and if the pressure differential across one or more of the filters exceeds a system parameter (e.g., 10 psi), a filter backwash sequence will be initiated. The "backwash" reverses the flow of water through the filter and causes the suspended solids to flow up through the media bed and exit the filter through a secondary outlet, through a check valve (CV2, CV3, or CV4), and to the discharge system 28.

Initiation of a backwash sequence also stops water flow to the reverse osmosis system (i.e., pump PMP1 is de-energized) until the backwash is complete. When the backwash is complete, if the pressure differential remains, the system will provide a warning, alarm, or shutdown as necessary.

As water exits the filtration subsystem 22, it encounters check valve CV5 and actuated valve V21. The path of water through check valve CV5 is discussed infra. Valve V21 controls whether water flows into the RO subsystem 24 and the control system opens and closes valve V21 based on the fluid level in storage tank T3 or based on the amount of time that has passed since the last RO subsystem 24 flush, as shown by step S14 in FIG. 2C.

When actuation of valve V21 is controlled by the fluid level in tank T3, an analog fluid level monitor LVL2 in the tanks T3 periodically provides data to the control system that is representative of the water level in the tank T3. When the minimum fluid level in tank T3 is reached, LVL1 notifies the control system and the control system sends a signal to open valve V21, thus allowing water to flow into the RO subsystem 24. When the maximum fluid level in tank T3 is reached, LVL2 notifies the control system and the control system sends a signal to close valve V21. The minimum and maximum fluid levels can be adjusted based on changing conditions such as water temperature, air temperature, or water demand. For example, the minimum fluid level may be set so that valve V21 is opened when the fluid level in tank T3 is 400 gallons and the maximum fluid level may be set so that valve 21 closes when the fluid level in tank T3 reaches 460 gallons, which is 88% of the total volume of tank T3.

When actuation of valve V21 is controlled by the time interval that has passed since the last time valve V21 was opened. This time interval is programmed into the control system and is dependent on the amount of time that water can be stagnant in the RO membranes without negatively affecting them. For example, the timer may be set to 180 minutes so that the RO subsystem gets flushed at least every 3 hours. The timer also measures the run time of the flush sequence to ensure that the RO membranes are sufficiently flushed. The run time of the flush sequence may be three minutes, or more or less, depending on the specification of the RO membranes. Once the required run time of the RO subsystem flush has expired, the control system closes valve V21.

When valve V21 is opened and water passes through the RO subsystem 24, one of two valves V23, V24 opens downstream of the RO subsystem 24. Which valve V23, V24 opens depends upon the level of total dissolved solids (TDS) in the water output from the RO subsystem 24, as measured at TDS monitor TDS2. After valve V23 or valve V24 opens, a fifteen second timer begins and at the end of fifteen seconds pump PMP3 activates. When V21 is closed due to possible alarm conditions, because tank T3 is full, or because an RO flush sequence has completed, pump PMP3 de-activates and a fifteen second timer begins. At the end of fifteen seconds, valves V23, V24 are closed.

Once valve V21 is opened, water exits the filtration subsystem 22, the injection pump PMP2 selectively introduces the anti-scaling solution from tank T2 at an injection point before the five-micron filter F7. Pump PMP2 is automatically activated when valve V21 is opened. The anti-scaling solution inhibits scaling on the RO membranes by select mineral content in the water and is held in a calculated dilute ratio on a tank T2. The amount of anti-scaling solution injected may vary, and it has been found that three parts per million of an anti-scaling solution sold by King Lee Technologies will suffice.

Figure 2B:
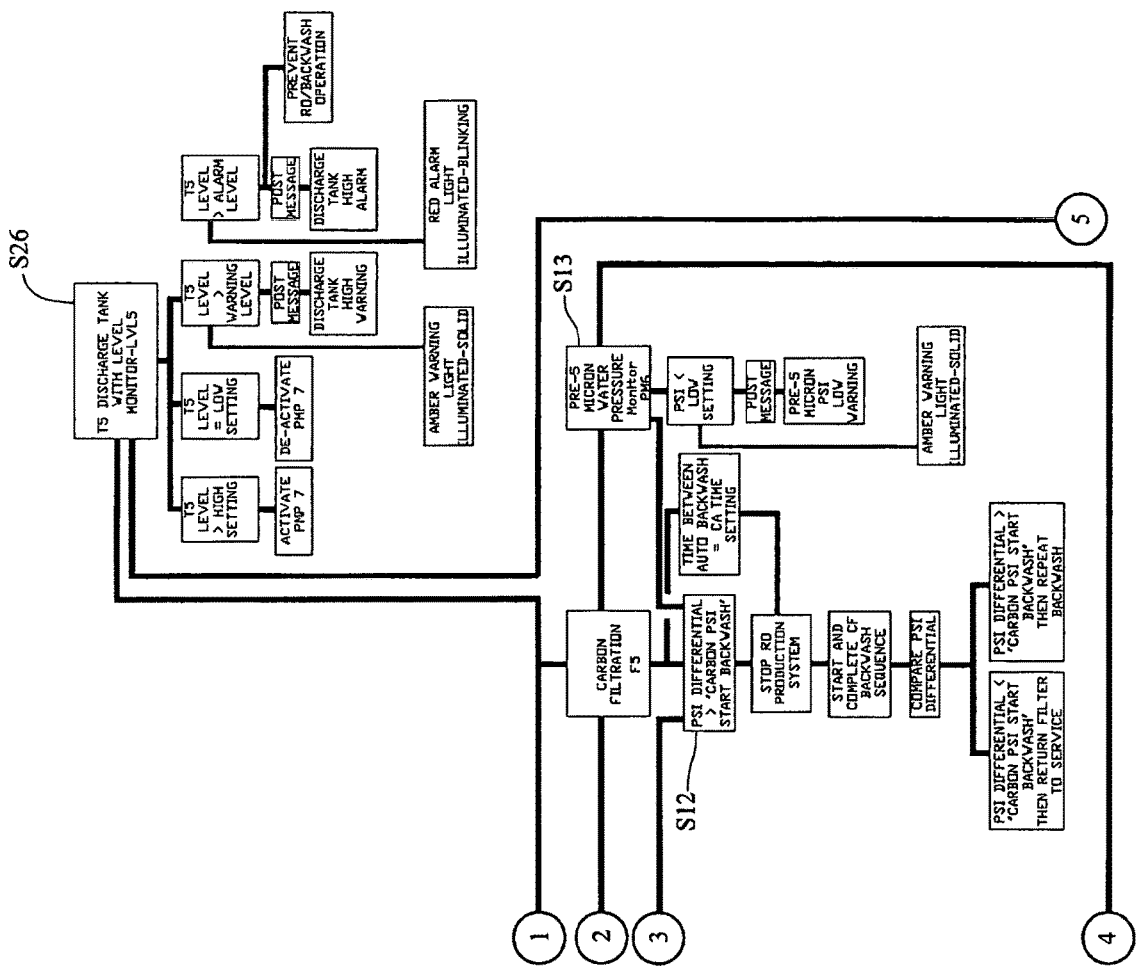
Figure 2C:
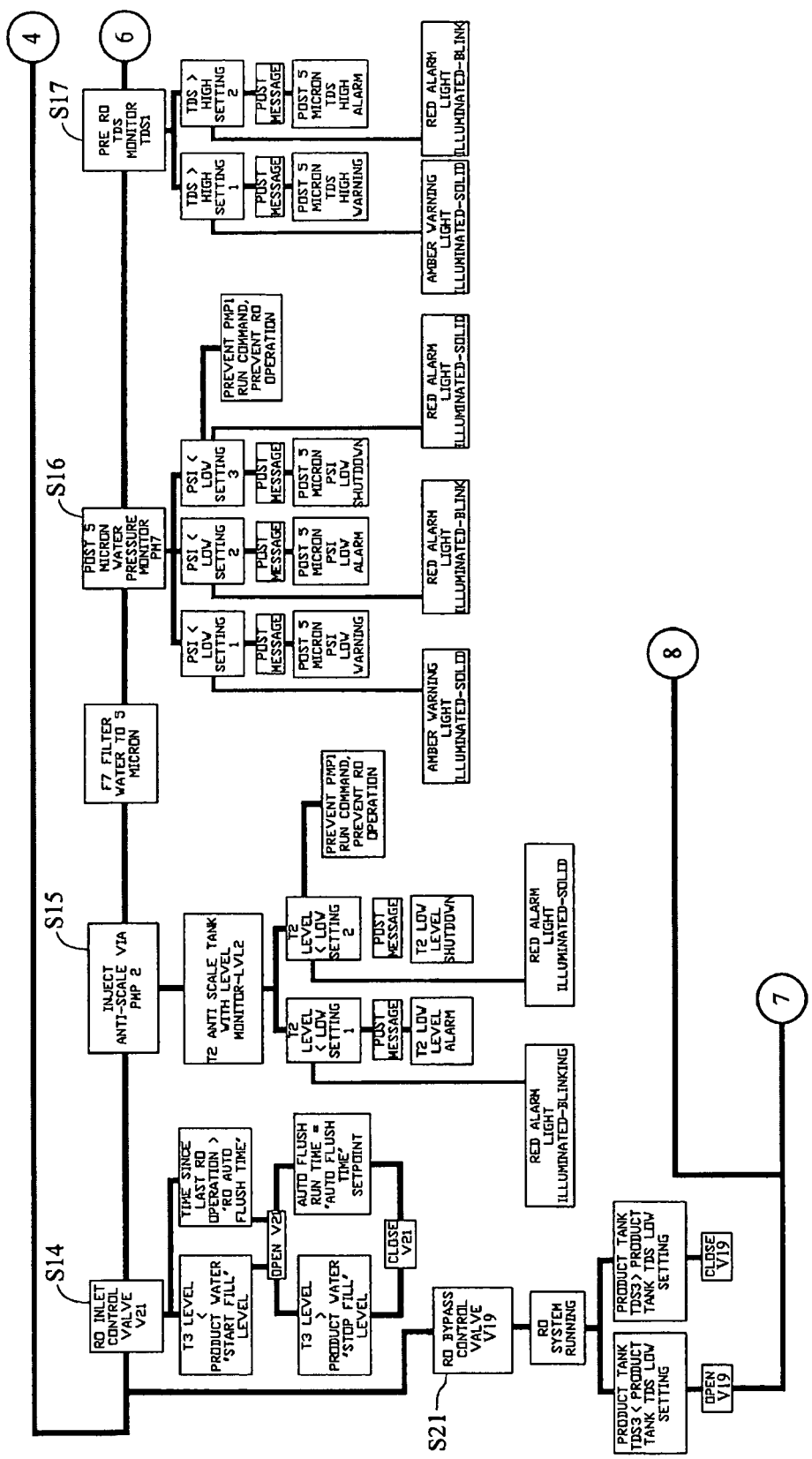

The control system prevents the RO subsystem 24 from operating if anti-scaling is not being injected; therefore, tank T2 has a level monitor and associated parameters for low level alarm and shutdown of the system, as shown by step S15 in FIG. 2C. The first low fluid level parameter is set for 2 gallons to provide an indication that tank T2 is nearly empty, with enough anti-scaling for approximately 2 days of continued operation. Falling below the first low fluid level parameter causes an alarm condition which is indicated by posting a message to the control system and by illumination of a blinking red light on the exterior of the trailer. The second low fluid level parameter measured in tank T2 is one that causes shutdown of the system if reached. This parameter is set for 0.5 gallons, which is considered the minimum water volume to keep pump PMP2 primed. If the fluid level in tank T2 reaches the second low fluid level parameter an alarm condition is indicated by posting a message to the control system and by illumination of a solid red light on the exterior of the trailer. After receiving this message, the control system issues a command that prevents PMP2 and the RO subsystem 24 from operating.

Downstream of the injection point for anti-scaling solution, the water passes through the five-micron cartridge filter F7. The filter F7 removes any suspended solids larger than five microns and also acts to blend the anti-scaling solution with the water flow.

Water flowing from filter F7 toward the RO subsystem 24 flows across pressure monitor PM7, which determines if the water pressure entering the RO subsystem 24 is sufficient for proper operation. The desired water pressure with no flow is 70 psi, and with flow is approximately 30 psi.

As shown by step S16 in FIG. 2C, several low pressure parameters are programmed into the control system as measured from PM7. A first low pressure parameter is set at 5 psi, which may indicate a pressure/flow issue in the supply line or be due to filter capacity overload. If the first low pressure parameter is reached a warning condition is indicated by posting a message to the control system and by illumination of a solid amber light on the exterior of the trailer. The RO subsystem 24 will still operate at this first low pressure parameter, but the condition needs to be addressed. A second low pressure parameter is set at 3 psi, which is indicative of an impending failure of filter F7, or in combination with other pressure alarms may indicate a failure of an upstream pump or filter operation. If the second low pressure parameter is reached an alarm condition is indicated by posting a message to the control system and by illumination of a blinking red light on the exterior of the trailer. The RO subsystem 24 will still operate at this second low pressure parameter, but the condition needs to be addressed. Finally, a third low pressure parameter is set at 1 psi, which is a pressure level that will begin to damage components of the system and the system must be shut down. If the third low pressure parameter is reached an alarm condition is indicated by posting a message to the control system and by illumination of a solid red light on the exterior of the trailer. After receiving this message, the control system issues a command that prevents PMP3 and the RO subsystem 24 from operating and the system must be examined and reset before normal operation can continue.

After pressure monitor PM7, the total-dissolved-solids monitor TDS1 provides to the control system data representative of the water quality after all pre-RO filtering has been achieved. Measuring the total dissolved solids at TDS1 provides information related to the water that is helpful to understand the water quality to be processed through the RO subsystem. If the value is above the system threshold control system, the system will provide a warning, alarm, or shut down as needed. As shown by step S17 in FIG. 2C, parameters associated with TDS1 are as follows:

TDS High Warning (high setting 1): This parameter is normally set at 1500 parts per million (ppm). This indicates a high salt content water or other parameters and requires consideration for analysis of the water. When this parameter is exceeded a warning condition is indicated by posting a message to the control system and by illumination of a solid amber light on the exterior of the trailer.

TDS High Alarm (high setting 2): This parameter is normally set at 2000, but may be adjusted based on location and conditions. Levels above 2000 ppm may require exchange of the RO membranes in order to perform ion removal effectively, and triggers the requirement for a water analysis to be completed. When this parameter is reached an alarm condition is indicated by posting a message to the control system and by illumination of a blinking red light on the exterior of the trailer If the monitor TDS1 indicates total dissolve solids following pre-RO filtration is within acceptable parameters. Typically, the high-pressure pump PMP3 is actuated twenty seconds after actuation of PMP1. The high-pressure pump PMP3 introduces the filtered water to the RO membrane array F8 and is controlled by a variable frequency drive. This drive controls the speed of the pump in order to produce a given pressure as set by the operator, in accordance with manufacturer settings for the RO membranes. The pressure setting is derived by calculation based on the desired output from the RO subsystem 24 and the pressure rating of the surrounding equipment.

Figure 2D:
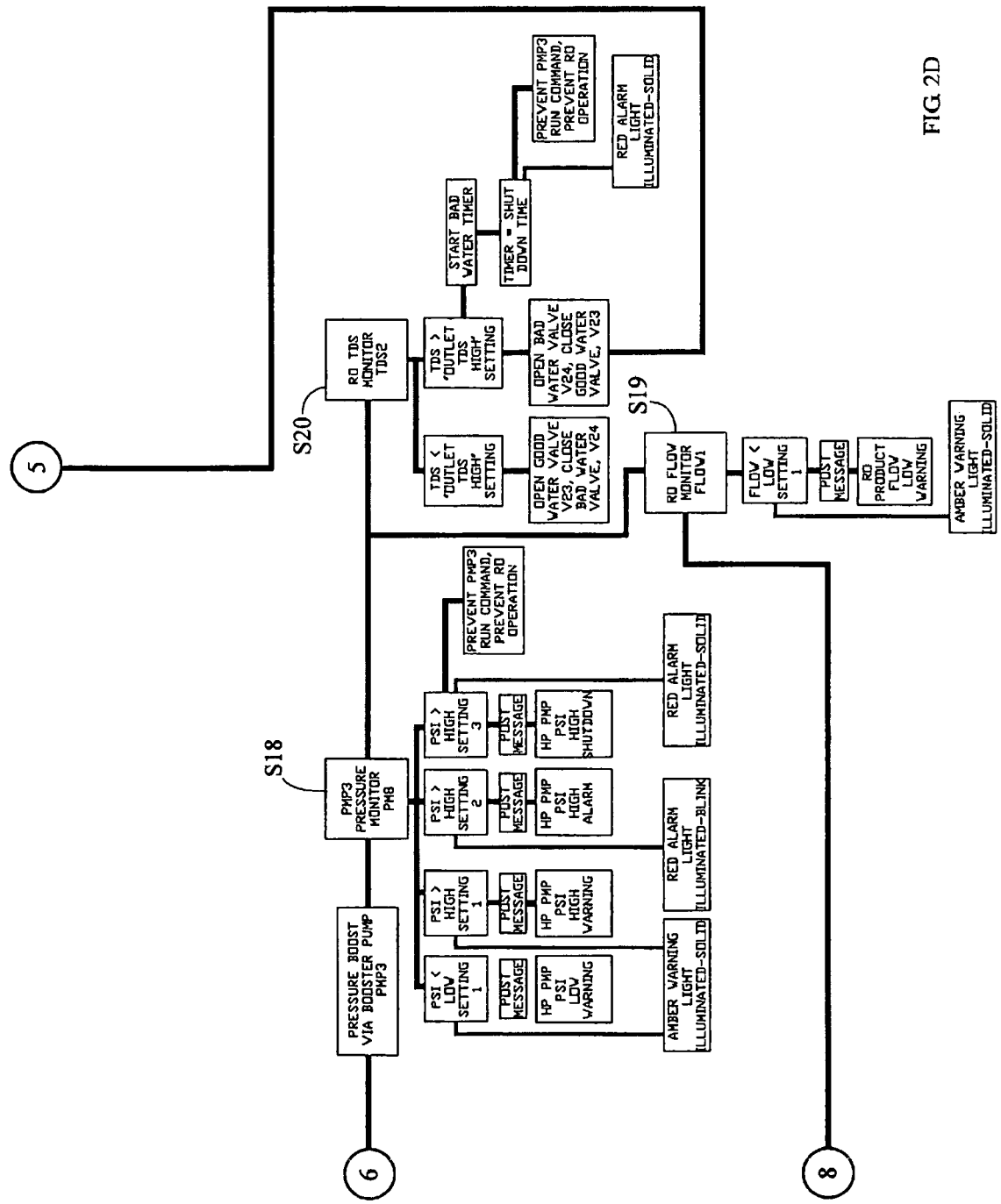

After exiting PMP3, water flows through needle valve V22 to pressure monitor PM8. Pressure monitor PM8 determines if the water pressure entering the RO membranes is within acceptable parameters for proper operation. The desired water pressure with no flow is 0 psi, and with flow is approximately 185 psi, but this setting will vary depending on the membrane type used and the water quality and water temperature. The setting will be calculated and set at the start-up of operation by a qualified engineer. Several pressure parameters are measured at pressure monitor PM8 to ensure proper system operation, as shown by step S18 in FIG. 2D. There are as follows:

Low Pressure Level Warning (low setting 1): This parameter is set for 100 psi, which indicates pump PMP3 may be partially clogged or wearing of the impellers has occurred. The RO subsystem 24 will still operate at this pressure level, but the condition needs to be addressed. When this parameter is reached a warning condition is indicated by posting a message to the control system and by illumination of a solid amber light on the exterior of the trailer.

High Pressure Level Warning (high setting 1): This parameter is set for 220 psi, which is a pressure above normal and may indicate a climb in pressure that will become harmful to the RO subsystem 24. The RO subsystem 24 will still operate at this pressure level, but the condition needs to be addressed. When this parameter is reached a warning condition is indicated by posting a message to the control system and by illumination of a solid amber light on the exterior of the trailer.

High Pressure Level Alarm (high setting 2): This parameter is set for 225 psi, which indicates a continued climb of pressure and could become harmful to the RO subsystem 24 over long periods. An adjustment of the pressure is necessary at this time and the condition must be acknowledged by an operator. When this parameter is reached an alarm condition is indicated by posting a message to the control system and by illumination of a blinking red light on the exterior of the trailer.

High Pressure Level Alarm (high setting 3): This parameter is set for 230 psi, which is within 10 percent of the pressure rating of the membrane housings and associated piping. When this parameter is reached an alarm condition is indicated by posting a message to the control system and by illumination of a solid red light on the exterior of the trailer. After receiving this message, the control system issues a command that prevents PMP3 and the RO subsystem 24 from operating and the system must be examined and corrected, with a reset required prior to resuming operations.

When valve V21 is open and assuming normal operation of the system, the RO membrane array F8 receives water from the high-pressure pump PMP3 at the first stage 50. By the nature of the membrane, first portion of the received water will flow through the first stage 50, whereas a second portion of the water will flow to the second stage 52 still carrying minerals. Some of the water entering the second stage 52 passes through the membrane, whereas some of the water is rejected by the second stage 52 along with dissolved minerals.

Rejected water from the RO membrane array flows from the secondary outlet 64 to the needle valves V25, 26. At the needle valves V25, V26, the rejected water may be directed back to PMP3 through visual gauge VF2, to the discharge tank via V26, or some combination of both. Rejected water directed through valve V25 becomes recycled water that is again run through the RO array F8.

Water passing through the first stage 50 or second stage 52 flows to flow monitor Flow1 in FIG. 1B. At flow monitor Flow1 information regarding the RO subsystem 24 flow output is provided to give feedback on the RO membrane output relative to the pressure and to help monitor operation of the membranes. The parameters associated with the flow at flow monitor Flow1 are shown by step S19 in FIG. 2D as follows:

Process Flow Low Warning: This parameter is set at 1 gpm. This level of flow indicates an impending failure of the RO membranes related to scale or organic fouling. The RO subsystem can continue to run and produce any output possible, but provides the warning that the membranes will need to be cleaned or replaced. When this parameter is reached a warning condition is indicated by posting a message to the control system and by illumination of a solid amber light on the exterior of the trailer.

Once the water passes flow monitor Flow1 (or FLW1 in FIG. 2D), the water continues through total-dissolved-solids monitor TDS2 and through valve V23 or valve V24. At the valves V23, V24, the water is either directed to the discharge tank T5 or the storage tank T3—i.e., only one of V23 and V24 is open at any given time. The control system opens either V23 or V24 based on data received from monitor TDS2. Because the membranes are not designed to handle backpressure, when V21 is open, either one of valve V23 or valve V24 is also open, as discussed supra.

Total-dissolved-solids monitor TDS2 provided TDS information related to the water processed through the RO subsystem 24. The result of this measurement determines the path of the water and is driven by a set point that is considered "good water". This set point is determined based on the incoming water TDS and is programmed into the control system by the qualified engineer at time of start-up. Unless conditions dictate otherwise, the set point for this parameter is 20 ppm. As shown by step S20 in FIG. 2D, the activities associated with this set point are as follows:

TDS>Set Point: Upon activation of the RO subsystem 24, the Bad Water valve V24 will be opened and the Good Water valve V23 will be closed. This diverts product water to the discharge tank T5 to be disposed of, as shown in FIG. 2B. Upon opening of valve V23, a timer will begin. This timer is normally set at 5 minutes, which is the allotted time to allow the RO membranes to rinse down and produce "Good Water." If the timer expires and the water is still above the TDS set point, an alarm condition is indicated by posting a message to the control system and by illumination of a solid red light on the exterior of the trailer. After receiving this message, the control system issues a command that prevents PMP3 and the RO subsystem 24 from operating and the system must be examined and corrected, with a reset required prior to resuming operations.

TDS<Set point: During RO subsystem 24 operation, the Good Water valve V23 is opened and the Bad Water valve V24 is closed. This will direct the product water to the product water tank T3 for use.

Water from filter F6 may be introduced to the flow line of water from valve V23 toward the collection tank T3. Water flow from filter F6 is initiated by actuated valve V19. The control system opens valve V19 based upon the level of total dissolved solids in the collection tank T3, as measured by total-dissolved-solids monitor TDS3. When the total dissolved solids in the collection tank T3 reach a certain set point programmed into the control system, valve V19 is opened and water flowing from carbon filter F5 is directed through filter F6. Filter F6 is preferably a 1 micron filter. When the total dissolved solids in the collection tank T3 fall below the set point programmed into the control system, valve V19 is closed. The purpose of allowing water to flow from filter F6 is to add mineral content back to the product tank as needed to improve taste and body of the water.

The value that determines if the valve will be open or closed is normally set at 20 ppm total dissolved solids, but may be modified based on water analysis, water temperature, and judgment by the engineer. The operation of valve V19 is shown by step S21 in FIG. 2C. If the product tank TDS<Product tank TDS low setting, open the RO bypass control valve V19. A manual flow control needle valve V20 determines the flow rate to the tank T3. When the Product tank TDS>Product tank TDS low setting, close the RO bypass control valve V19.

The volume of product water received by the collection tank T3 is monitored by an analog level sensor LVL2. This measurement is displayed as a tank level in gallons, and trigger points from this sensor determine when processed water should flow into this tank, or stop. This system also uses information from this sensor to determine if the tank level is too high, or too low and provides warnings, alarms, and shutdown messages as necessary.

Figure 2E:
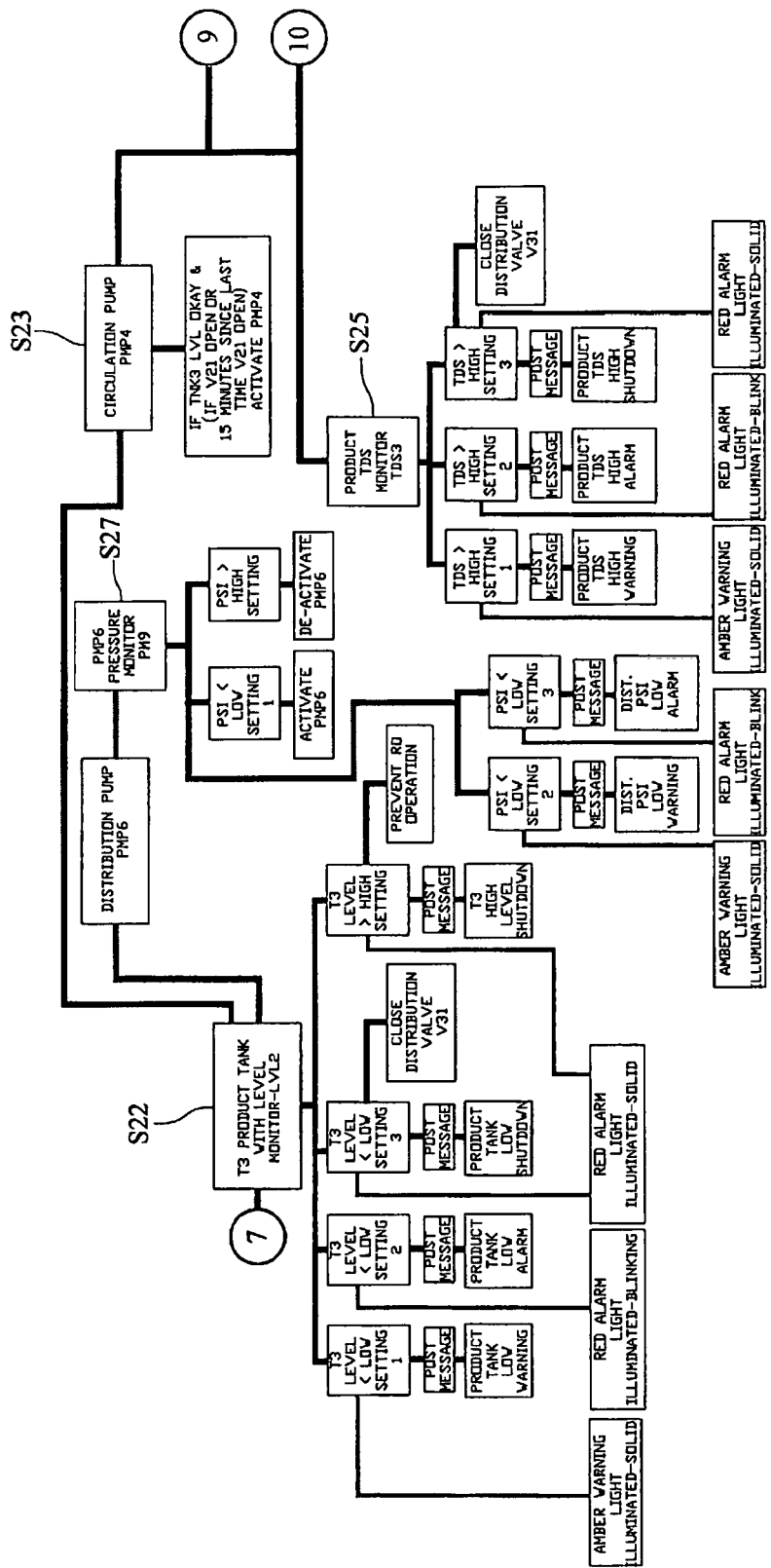

In FIG. 2E, the input of the sensor LVL2 to the control system is demonstrated at step S22 with the following parameters:

Low Level Warning (low setting 1): This parameter is normally set at 200 gallons. This provides a warning of impending shortage of water while operations are still normal. This warning level is also used as the minimum level of water to allow for distribution in a start-up sequence. When this parameter is reached a warning condition is indicated by posting a message to the control system and by illumination of a solid amber light on the exterior of the trailer Low Level Alarm (low setting 2): This parameter is normally set at 180 gallons. This provides an alarm with approximately 20 gallons, or 5 minutes, of operation remaining prior to shut down. When this parameter is reached an alarm condition is indicated by posting a message to the control system and by illumination of a blinking red light on the exterior of the trailer.

Low Level Shutdown (low setting 3): This parameter is normally set at 160 gallons. This level is the minimum at which the distribution pump PMP6 can run without cavitation. When this parameter is reached an alarm condition is indicated by posting a message to the control system and by illumination of a solid red light on the exterior of the trailer. After receiving this message, the control system issues a command that stops pump PMP6 and closes distribution valve V31. A reset of the system will be required to start operations again.

High Level Shutdown (high setting): This parameter is set at 700 gallons and represents the maximum water level that allows operation of the level sensor. When this parameter is reached an alarm condition is indicated by posting a message to the control system and by illumination of a solid red light on the exterior of the trailer. After receiving this message, the control system issues a command that suspends operation of the RO subsystem 24 until the level of fluid in tank T3 returns to the normal activation height, as discussed supra in connection with operation of control valve V21.

Water in the collection tank T3 is monitored by the post-treatment monitoring subsystem, which includes total-dissolved-solids monitor TDS3. The control system will not energize distribution pump PMP6 unless pH, total dissolved solids, and chorine measurements are within operator-defined acceptable ranges.

To monitor these parameters, the circulation pump PMP4 pulls water from the tank T3 and displaces it through a manifold 72 and back to the tank T3. The return line is preferably reduced and submerged in the tank, causing a mixing action.

The manifold 72 contains a throttling valve V28, test port TP, total-dissolved-solids monitor TDS3, a chlorine injection point, and a small bleed line that provides a side stream of water to a probe well containing a free chlorine monitor probe CL1 and a pH monitor probe pH1. The circulation pump PMP4 activates and runs anytime water is being introduced to the product tank T3 while the tank water level is above an operator-defined minimum. In addition, the pump activates every fifteen minutes that water from the RO array F8 product water is not introduced into the tank T3, as shown by step S23 in FIG. 2E.

At each activation, the pump PMP4 is energized for 2 minutes to establish a mixing flow prior to any reaction to the monitor readings. After the two-minute period, the free chlorine level provided from the chlorine monitor CL1 is compared by the control system to a set point. Depending on the difference between the set point and reading, the control system will energize the chlorine injection pump PMP5 to introduce chlorine into the tank T3. The concentrated chlorine solution such as sodium hypochlorite is stored in a tank T4 connected to the injection pump PMP5. If the chlorine level falls below the minimum, or goes above the maximum designated parameter, the system will provide a warning, alarm, or shut down as necessary.

Figure 2F:
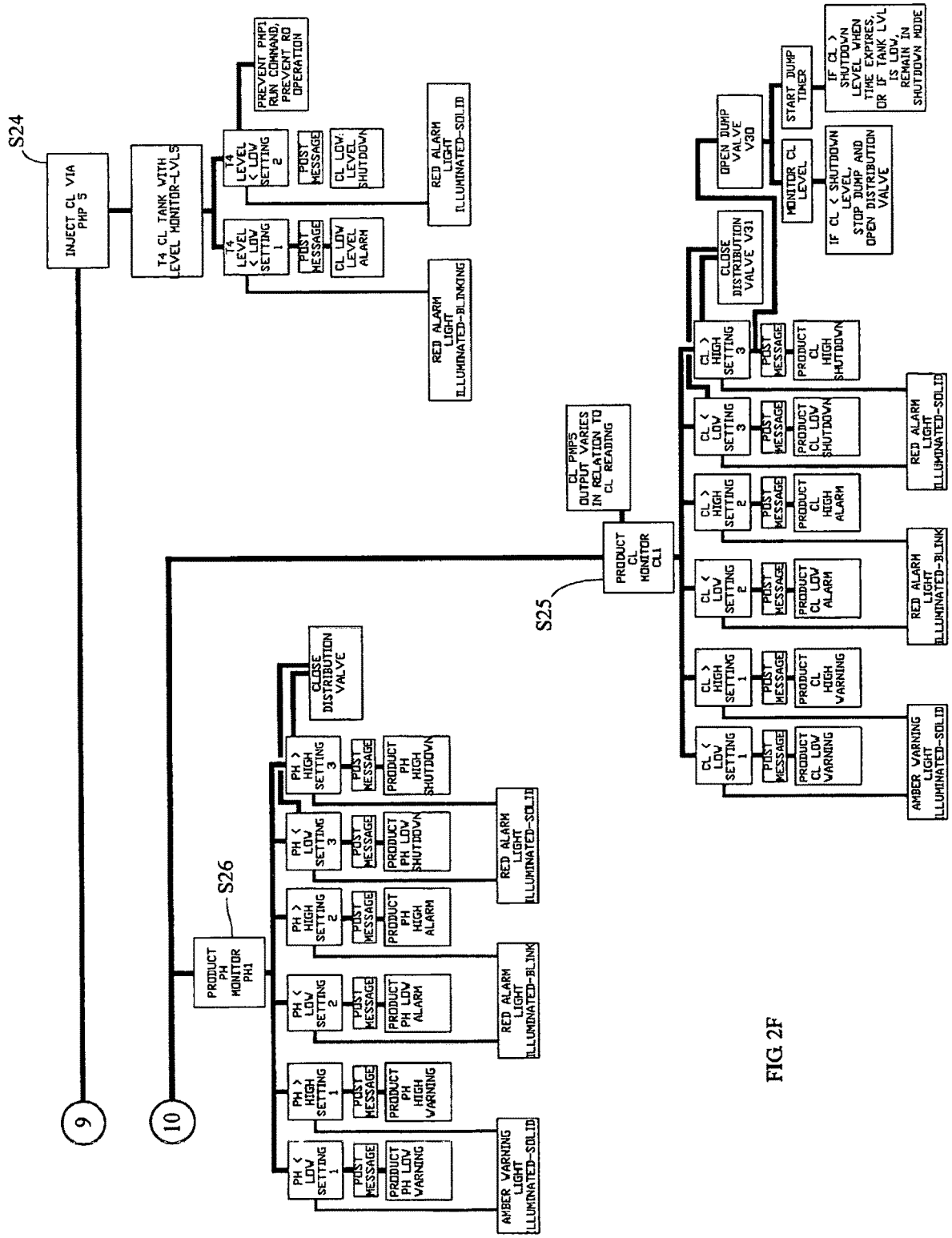

In FIG. 2F, the input of chlorine monitor CL1 to the control system and operation of pump PMP5 is demonstrated at step S24. When activated, the pump PMP5 operates based on a variable signal generated in relation to the measured chlorine level, and ramps up or down as necessary to achieve the correct setting. A PID loop is utilized to manage the pump speed. The normal setting for chlorine level in the product water is 0.4 ppm free chlorine. The RO subsystem 24 is not allowed to operate if the chlorine tank T4 is empty and therefore chlorine is not being injected. Therefore tank T4 has a level monitor and associated parameters for low level alarm and shutdown of the system, with the following parameters:

Low Level Alarm (low setting 1): This parameter is set at 2 gallons, which equals approximately 2 days remaining supply. When this parameter is reached an alarm condition is indicated by posting a message to the control system and by illumination of a blinking red light on the exterior of the trailer.

Low Level Shutdown (low setting 2): This parameters is set at 0.5 gallons, which is the minimum fluid level to keep the injection pump primed. When this parameter is reached an alarm condition is indicated by posting a message to the control system and by illumination of a solid red light on the exterior of the trailer. After receiving this message, the control system issues a command that stops the RO subsystem 24 until the condition is resolved.

Because completely filtered water does not taste good, a designated set point for the total dissolved solids in the product tank is monitored by the system. If the TDS level is below this set point, a bypass solenoid valve V19 will open to allow fully filtered (including additional one-micron filter F6) water, to enter the tank T3 as discussed supra. The flow rate of this bypass is controlled by a throttling valve V20 to ensure excess pressure is not lost through the bypass. This bypass flow will increase the total-dissolved solids in the product tank T3 to the set point, which generally improves the taste and body of the product water as opposed to when there are no dissolved solids. The control system will activate the valve V19 as necessary to meet the TDS set point.

In an alternative embodiment, instead of the one-micron filter F6, the system operator may deposit various desirable mineral salts into the chlorine tank T4 that will be injected with chlorine into the product water tank T3. For example, if the tank T4 has a ten-gallon capacity, one appropriate mixture may be 200 mL of 5% bleach and 200 mL of mineral salt. As data from the chlorine monitor triggers the control system to energize the pump PMP4, the mineral salts are also injected into the 550 gallon tank T3 to provide a more desirable taste relative to completely purified water.

TDS monitor TDS3 also monitors the total dissolved solids in tank T3 to ensure that do not fall below the minimum or go above the maximum designated parameter. In FIG. 2E, the input of TDS monitor TDS3 to the control system is shown by step S25, with the following parameters:

TDS High Warning (high setting 1): This parameter is normally set at 70 ppm TDS, which is a level indicative that the bypass system may be over-supplying water to the product tank T3. When this parameter is reached a warning condition is indicated by posting a message to the control system and by illumination of a solid amber light on the exterior of the trailer.

TDS High Alarm (high setting 2): This parameter is normally set at 100 ppm TDS, which indicates that the TDS level is continuing to climb and there is a failure in either the bypass valve V21 or the RO membranes. When this parameter is reached an alarm condition is indicated by posting a message to the control system and by illumination of a blinking red light on the exterior of the trailer TDS High Shutdown (high setting 3): This parameter is normally set at 200 ppm TDS, which indicates a definite failure in the system and requires shutdown of the distribution pump until the water can be analyzed and/or the failure repaired. When this parameter is reached an alarm condition is indicated by posting a message to the control system and by illumination of a solid red light on the exterior of the trailer. After receiving this message, the control system issues a command that stops pump PMP6 and closes distribution valve V31 until the condition is resolved.

The pH of the water in tank T3 is monitored by PH1, which delivers pH information to the chlorine analyzer to ensure the CL readings are accurate, and also provides information related to the pH for data gathering purposes. pH is not a critical control point, therefore no shutdown is mandated by the EPA related to this reading, however, the following parameters are associated with it as shown by step S26 in FIG. 2F:

pH Low Warning (low setting 1): This parameter is normally set at 5. This provides an indication that the water is on the low end of pleasant taste and that additional water bypass may be required to help neutralize the water. When this parameter is reached a warning condition is indicated by posting a message to the control system and by illumination of a solid amber light on the exterior of the trailer.

pH Low Alarm (low setting 2): This parameter is normally set at 4.5. This provides an indication of continued decline of the pH, or that the pH probe is in need of re-calibration. When this parameter is reached an alarm condition is indicated by posting a message to the control system and by illumination of a blinking red light on the exterior of the trailer. This alarm must be acknowledged by the operator.

pH Low Shutdown (low setting 3): This parameter is normally set at 4.0. When this parameter is reached an alarm condition is indicated by posting a message to the control system and by illumination of a solid red light on the exterior of the trailer. After receiving this message, the control system issues a command that stops pump PMP6 and closes distribution valve V31 until the condition is resolved.

pH High Warning (high setting 1): This parameter is normally set at 9. This provides an indication that the water is on the high end of pleasant taste and that adjustments in chlorine level or bypass may need to be made to correct the situation. When this parameter is reached a warning condition is indicated by posting a message to the control system and by illumination of a solid amber light on the exterior of the trailer.

pH High Alarm (high setting 2): This parameter is normally set at 10. This provides an indication of continued rise of the pH, or that the pH probe is in need of re-calibration. When this parameter is reached an alarm condition is indicated by posting a message to the control system and by illumination of a blinking red light on the exterior of the trailer. This alarm must be acknowledged by the operator.

pH High Shutdown (high setting 3): This parameter is normally set at 11. This level exceeds normal water standards and requires attention prior to any further distribution of the product water. The shutdown must be acknowledged and reset by an operator. When this parameter is reached an alarm condition is indicated by posting a message to the control system and by illumination of a solid red light on the exterior of the trailer. After receiving this message, the control system issues a command that stops pump PMP6 and closes distribution valve V31 until the condition is resolved.

If the chlorine level at CL1 falls below the minimum level designated, a distribution solenoid valve V31 will close, preventing delivery of the product water to external points of demand. The circulation pump PMP4 will run, and the chlorine injection pump PMP5 will be energized to inject sodium hypochlorite. When the level rises above the low set point, the distribution solenoid valve 31 will re-open and allow water to exit.

In the event that the chlorine monitor CL1 detects a chlorine level above the maximum level designated, the distribution solenoid valve V31 will close, preventing delivery of the product water. The circulation pump PMP4 will run, chlorine injection will be prohibited, and a dump solenoid valve V30 will open to move water from the product tank T3 to the discharge tank T5. The drop in level in the product tank T3 will activate the RO system, which will add water and prevent injection of chlorine at the same time, thus causing the chlorine level to drop. Once the level is detected at a value lower than the maximum allowed level, the dump valve V30 will close and the distribution valve V31 will reopen. If this attempt to remedy the chlorine level is not successful within a designated time (e.g., 30 minutes), the system will provide an alarm and shut down.

In FIG. 2F, the input of chlorine monitor CL1 to the control system is shown by step S25, with the following parameters:

CL Low Warning (low setting 1): This parameter is normally set at 0.25 ppm. This provides an indication that the CL level is approaching the minimum EPA required level for potable water supply. When this parameter is reached a warning condition is indicated by posting a message to the control system and by illumination of a solid amber light on the exterior of the trailer.

CL Low Alarm (low setting 2): This parameter is normally set at 0.18 ppm. This provides an indication of continued decline of the CL level. It indicates that the chlorine injection pump may be failing, or the CL probe needs to be re-calibrated. When this parameter is reached an alarm condition is indicated by posting a message to the control system and by illumination of a blinking red light on the exterior of the trailer. This alarm must be acknowledged by the operator.

CL Low Shutdown (low setting 3): This parameter is normally set at 0.05 ppm. This level indicates a failure in the injection system and requires a shutdown of the distribution system. When this parameter is reached an alarm condition is indicated by posting a message to the control system and by illumination of a solid red light on the exterior of the trailer. After receiving this message, the control system issues a command that closes the distribution valve V31 and opens the dump valve V30. The chlorine level must recover and the operator must reset the system prior to re-distribution.

CL High Warning (high setting 1): This parameter is normally set at 1.4 ppm. This provides an indication that the water is on the high end of pleasant taste and that the chlorine level is climbing significantly above the set point. When this parameter is reached a warning condition is indicated by posting a message to the control system and by illumination of a solid amber light on the exterior of the trailer.

CL High Alarm (high setting 2): This parameter is normally set at 1.6 ppm. This provides an indication of continued rise of the CL level, or that the CL probe is in need of re-calibration. When this parameter is reached an alarm condition is indicated by posting a message to the control system and by illumination of a blinking red light on the exterior of the trailer. This alarm must be acknowledged by the operator. This alarm point will cause the CL pump to be disabled until levels are lowered.

CL High Shutdown (high setting 3): This parameter is normally set at 2.0 ppm. This level exceeds normal water standards and requires attention prior to any further distribution of the product water. The shutdown must be acknowledged and reset by an operator. When this parameter is reached an alarm condition is indicated by posting a message to the control system and by illumination of a solid red light on the exterior of the trailer. After receiving this message, the control system issues a command that closes the distribution valve V31 and opens the dump valve V30. The chlorine level must recover and the operator must reset the system prior to re-distribution.

The discharge water produced from the above processes is directed to and stored in a sixty-five gallon tank discharge storage tank T5 by PMP6. From this tank, the water is delivered to an external delivery point under pressure. Backwash water from the filters, RO reject (bad) water, dump valve water, AC system condensate, and Ice System discharge water are all directed to this tank T5. A pump PMP7 delivers the water from the tank T5 to the delivery point. The delivery is intermittent and is based on an analog level sensor LVL3 that measures and provides a signal to the control system. This is displayed as a tank level in gallons, and trigger points from this sensor determine when the discharge pump PMP7 will activate and de-activate. The control system also uses information from this sensor to determine if the discharge tank level is too high, or too low and provides warnings, alarms, and shutdown messages as necessary. The check valve CV11 prevents reverse flow of the discharge water back into the tank T5 once discharged.

In FIG. 2B, the input of level sensor LVL3 to the control system is shown by step S26, with the following parameters:

Discharge Tank Level>High Setting: This parameter is normally set for 25 gallons. The control system activated discharge pump PMP7.

Discharge Tank Level<Low Setting: This parameter is normally set for 10 gallons. The control system deactivates discharge pump PMP7.

High Level Warning: This parameter is normally set at 56 gallons. This is 80% capacity for the tank T5 and indicates that the discharge pump PMP7 cannot keep up with current delivery rates to the discharge tank. When this parameter is reached a warning condition is indicated by posting a message to the control system and by illumination of a solid amber light on the exterior of the trailer.

High Level Alarm: This parameter is normally set for 65 gallons. This is the maximum level that allows the level sensor LVL3 to function. When this parameter is reached an alarm condition is indicated by posting a message to the control system and by illumination of a solid red light on the exterior of the trailer. After receiving this message, the control system issues a command that stops all operations that send water to the discharge tank T5 to allow time for the tank level to lower. The alarm must be acknowledged by the operator.

Pressure is maintained using pump PMP6, pressure tank, and pressure monitor PM9. The pump PMP6 is connected to the product tank T3. When the control system is activated, pump is energized and pressure begins to build into a bladder within the pressure tank T6. An analog transmitting pressure sensor PM9 monitors the water pressure exerted by the pump and provides the information to the control system. When the pressure reaches the upper designated limit, the system stops the pump PMP6.

If a demand for water is placed on the system, the pressure will decline as water leaves the pressure tank. When the pressure reaches a lower limit, the control system will energize the pump PMP6 to build the pressure back up to the upper limit. A check valve CV10 is incorporated after the pump PMP6 to prevent water pressure from bleeding back to the product storage tank T3. If the pump PMP6 is unable to deliver water at a minimum designated pressure, a warning, alarm and shutdown will occur as necessary.

Typically the system is configured to operate between forty and fifty psi. When pressure within the bladder of tank T6 drops to forty psi, the control system energizes the distribution pump PMP6, which fills the bladder until the pressure reaches fifty psi.

A piping manifold is located after the pressurization system. This manifold contains the distribution solenoid valve V31, dump solenoid valve V30, a water meter FLOW2, and connection to the final delivery points. After the water meter, the delivery points are: external distribution connection; ice machine feed line; container filling station (includes a carbon filter for chlorine removal); eye wash station; and safety shower station.

The system described above has manual and automated control capability, as well as remote monitoring and messaging capability. A plc system with proprietary code, referred to above as the control system, is incorporated into the design. The plc acts to monitor all input points, and provides outputs based on the code. A human-machine interface (HMI) displays the process graphically, provides control via pushbuttons (manual or automatic), and allows input of parameters that determine the plc operation. Warnings, alarms, and shutdown messages are displayed on this screen. A network device is incorporated that is connected to a router. This device allows for remote access through a wireless connection. The remote access will display the graphics seen on the human machine interface, on any personal computer that has the access codes. In addition, operation of the system is available through this connection.

The system records and maintains key parameters of the operation and displays them on a screen in the human machine interface. The parameters recorded and displayed include date, time, chlorine level in product tank, pH level in product tank, TDS level in product tank, and total gallon meter reading.

The data is collected approximately one time per hour and posted automatically by the plc to a designated display screen on the HMI. This data is also recorded in a csv file and stored on a USB storage device that is connected to the human machine interface. One time every twenty-four hours, the data in the csv file is saved with a specific file name related to the date stamp. This file is available through the remote connection for download and review.

The system can send an email through the network and wireless connection anytime an alarm is activated. This constitutes feed forward remote monitoring and improves the reaction time by a monitoring group in recognizing and correcting the problem.

In normal operation, the content of the product tank T3 is pressurized for delivery to external points of demand. This delivery will be available when all parameters are within the designated set points, and if sufficient water level exists in the tank.

Figure 3:
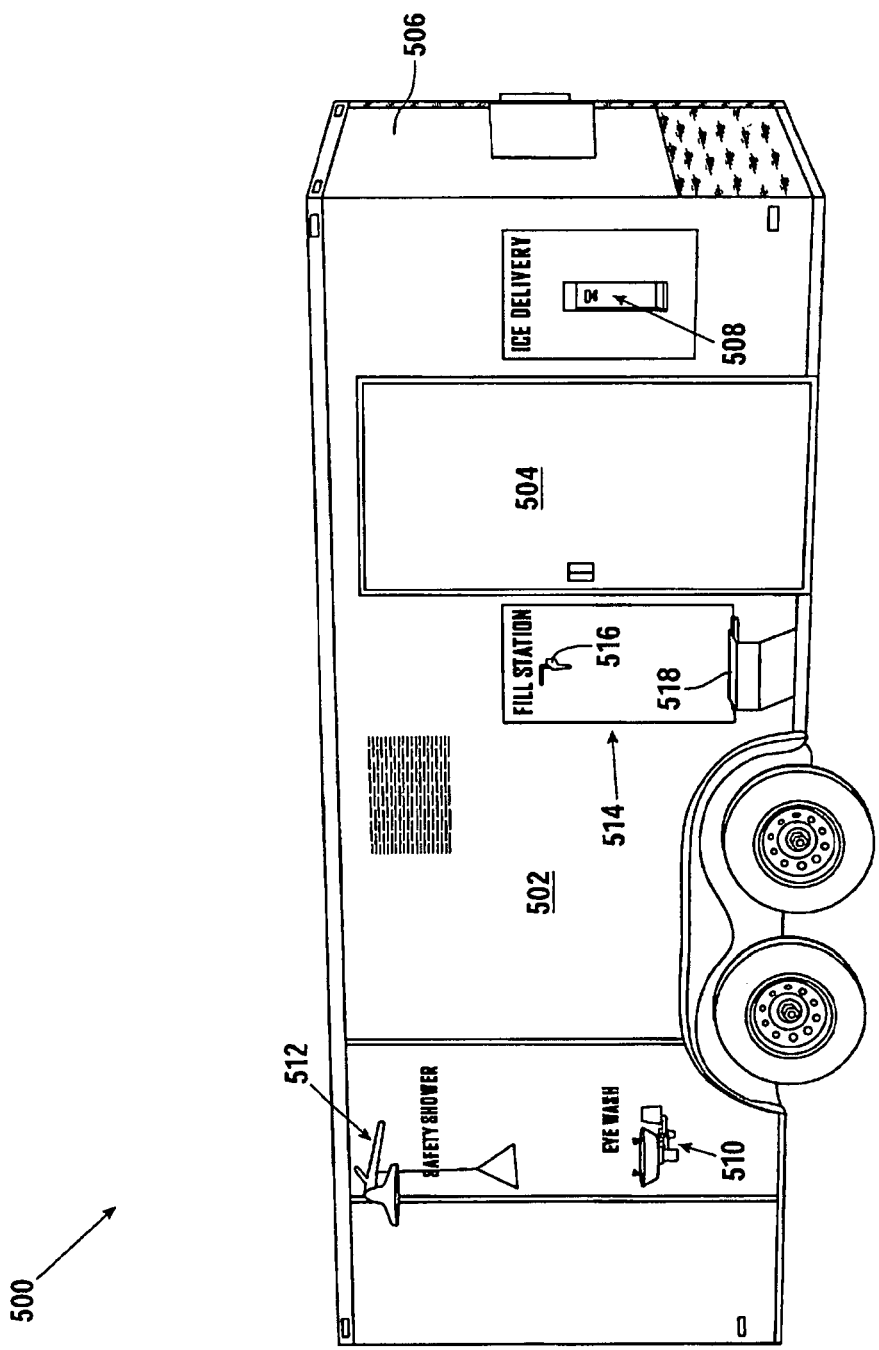
FIG. 3 is a side view of a trailer including the embodiment of the invention

FIG. 3 is a side view of a towable trailer 500 containing the system described with reference to FIGS. 1-2. The trailer 500 includes a sidewall 502, a door 504, and a front wall 506. The ice production machine described with reference to FIG. 1, which is located within the trailer 500, has an ice delivery chute 508 mounted to the sidewall between the door 504 and the front wall 506. An external eye wash 510 and a safety shower 512 are mounted to the sidewall 502 near the rear of the trailer 500, both of which are connected to and fed by the product water supply within the trailer 500.

A container fill station 514 is mounted to the sidewall next to the door and connected to the system within the trailer 500. The container fill station 514 includes a valve nozzle 516 and a shelf 518. The nozzle 516 is positioned above the shelf 518. A container to be filled may be placed on the shelf with its opening under the nozzle 516, thereby allowing the container to be filled when the valve nozzle 516 is open.

Figure 4:
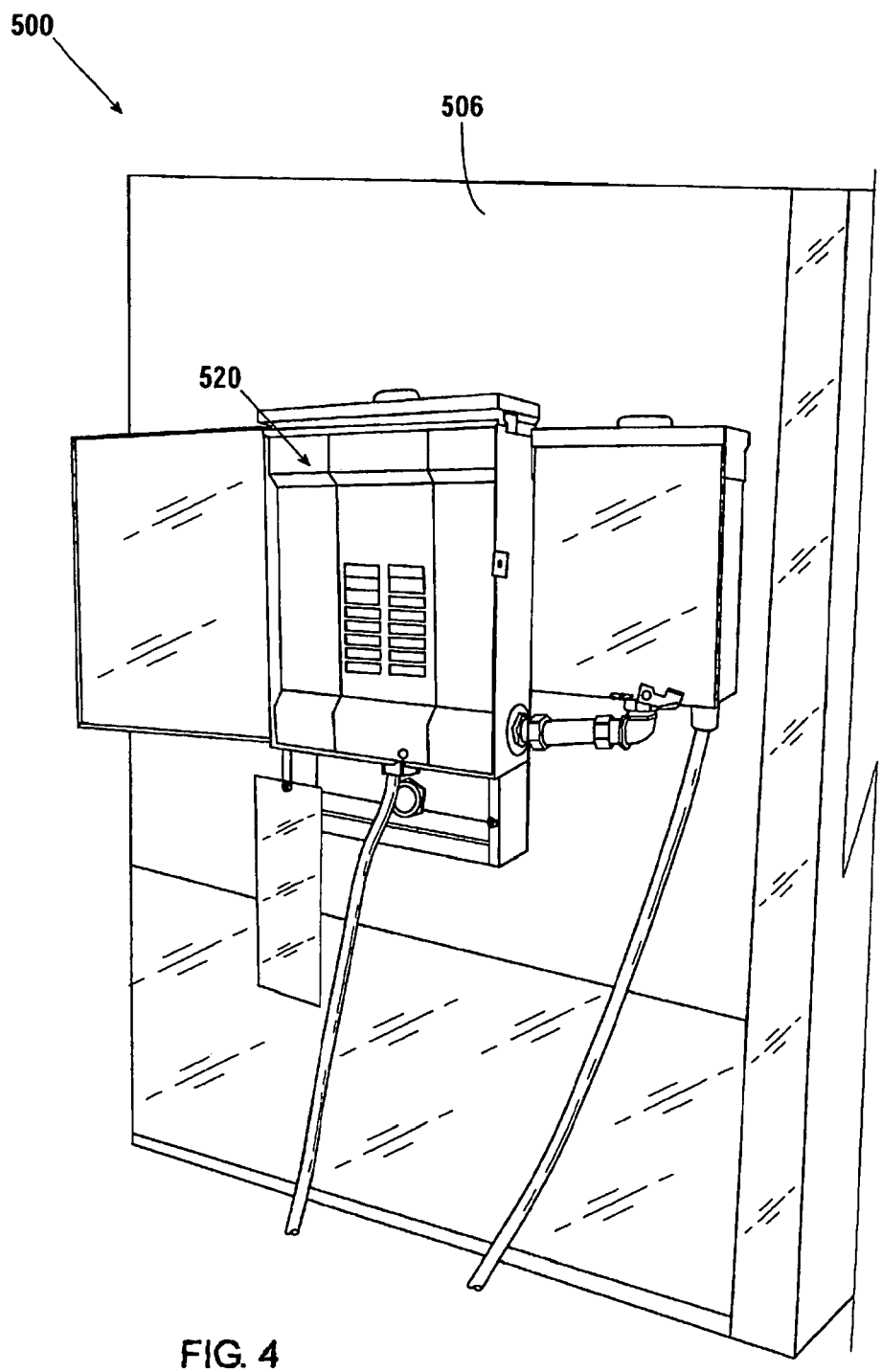
FIG. 4 is a front view of the trailer of FIG. 3.

FIG. 4 shows the front wall of the trailer 500 in more detail. An electrical panel 520 for the required service to the trailer is mounted to the front wall. The panel 520 allows for power connection, and provides circuit breaker protection for the trailer operation.

Figure 5:
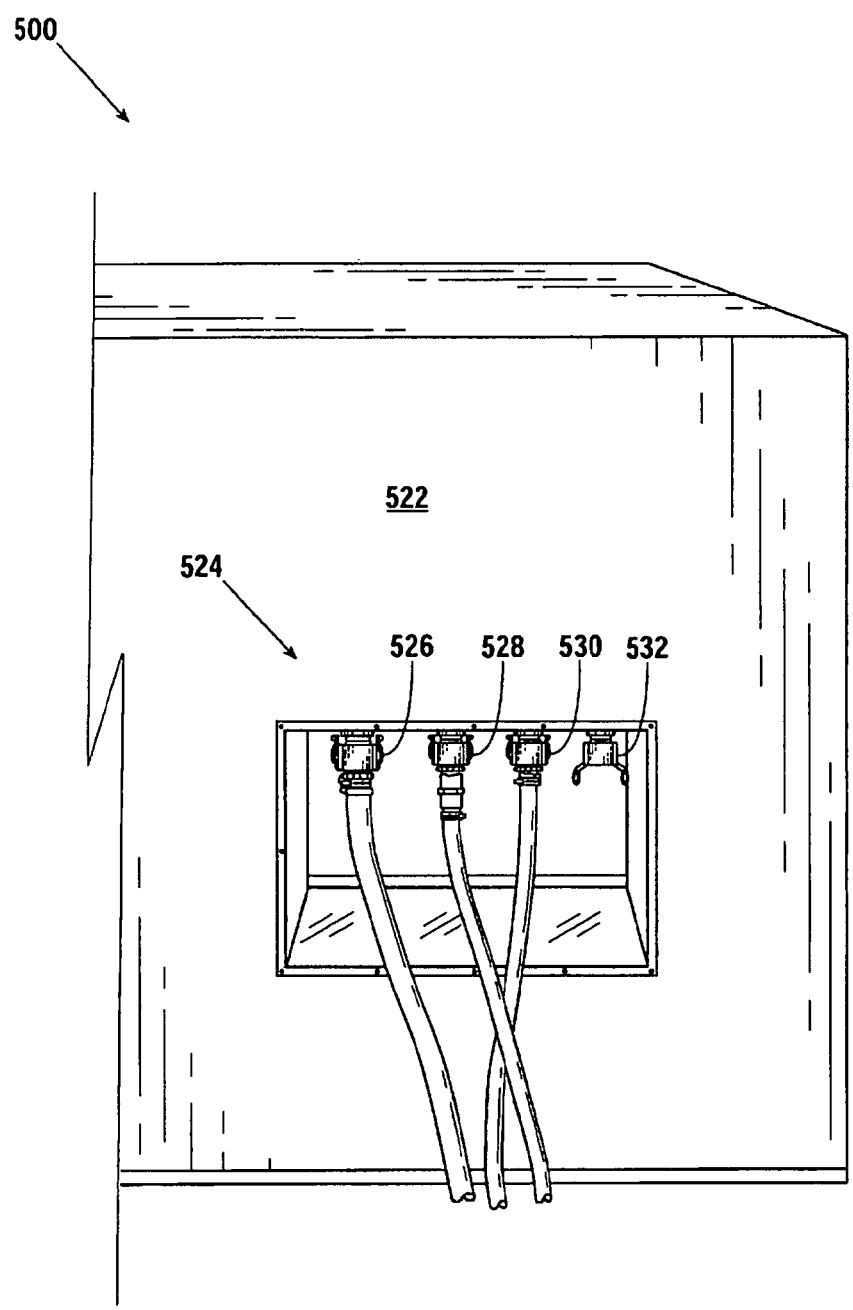
FIG. 5 is a second side view of the trailer of FIG. 3.

FIG. 5 shows part of the second long side 522 of the trailer 500 in more detail. An external/internal transfer station 524 is incorporated on the side 522 of the trailer. This station 524 contains four connections: a source water inlet connection 526, which is connected to the pretreatment inlet 30 (see FIG. 1); a discharge water outlet connection 528 connected to the discharge pump PMP7 within the trailer 500 (see FIG. 1); a primary product outlet connection 530 connected to the tank T6 within the trailer 500 (see FIG. 1); and an auxiliary product outlet connection 532 also connected to the tank T6.

The present invention is described in terms of a specifically-described embodiment. Those skilled in the art will recognize that alternative embodiments of such device can be used in carrying out the present invention. Other aspects and advantages of the present invention may be obtained from a study of this disclosure and the drawings, along with the appended claims.

The invention claimed is:

1. A water treatment system configured to process water, comprising:
   i) a transportable climate-controlled, enclosed environment and a water inlet;
   ii) in fluid communication with the water inlet, a multi-stage filter within the climate-controlled, enclosed environment;
   iii) in fluid communication with the multi-stage filter, a reverse osmosis unit within the climate-controlled, enclosed environment;
   iv) a chlorine monitor and a chlorine injection pump within the climate-controlled, enclosed environment configured to adjust a chlorine concentration of a water stream;
   v) a storage tank within the climate-controlled, enclosed environment to contain the quantity of potable water, and
   vi) an onboard control system within the climate-controlled, enclosed environment configured to allow monitor and control of at least a portion of the water treatment system from an offsite location.

2. The water treatment system of claim 1, wherein the onboard control system is in communication with an offsite computer or personal computer device that is remote to the enclosed environment.

3. The water treatment system of claim 1, wherein the onboard control system comprises a human-machine interface, a network device, and a storage device.

4. The water treatment system of claim 3, wherein the network device is configured to allow remote access through a wireless connection.

5. The water treatment system of claim 4, wherein the remote access displays graphics as seen on the human-machine interface on a personal computer device or offsite computer.

6. The water treatment system of claim 1, wherein the onboard control system records one or more key parameters of operation to a storage device.

7. The water treatment system of claim 6, wherein the key parameters of operation comprise one or more of the following: date, time, chlorine level, pH level, level of total dissolved solids, and total gallon meter reading.

8. The water treatment system of claim 7, wherein the onboard control system records one or more of the key parameters of operation to a csv file on the storage device at least once every hour.

9. The water treatment system of claim 1, wherein the onboard control system sends an email when an alarm is activated.

10. The water treatment system of claim 1, further comprising within the transportable climate-controlled, enclosed environment, a total dissolved solids sensor and a pH sensor.

11. The water treatment system of claim 10, wherein the total dissolved solids sensor and the pH sensor are configured for remote monitoring.

12. The water treatment system of claim 1, further comprising: a circulation pump within the transportable climate-controlled, enclosed environment that is operably connected to the storage tank to mix the quantity of potable water.

13. The water treatment system of claim 1, wherein temperature fluctuations are controlled to prevent water condensation in the transportable climate-controlled, enclosed environment.

14. The water treatment system of claim 1, wherein the enclosed environment is towable.

15. The water treatment system of claim 14, wherein the enclosed environment is a trailer.

16. The water treatment system of claim 1, further comprising: a potable water outlet connected to a camp housing manifold distribution system.

17. The water treatment system of claim 1, wherein the water treatment system is on-site at an oil drilling and/or natural gas drilling site.

18. The water treatment system of claim 1, wherein the water from the water inlet is non-potable water comprising bacteria, iron, sulfur, sand, organics, silt, or combinations thereof.

19. The water treatment system of claim 1, wherein the water treatment system is configured to treat up to 3000 ppm total dissolved solids in the water from the water inlet.

20. The water treatment system of claim 1, further comprising: a safety shower, an eye wash station, a container fill station, and an ice delivery chute that are accessible from outside the transportable climate-controlled, enclosed environment.

21. The water treatment system of claim 20, wherein the chlorine monitor and the chlorine injection pump are configured to maintain a quantity of potable water at a controlled chlorine concentration suitable for delivery to the eye wash station.

22. The water treatment system of claim 21, wherein the safety shower, the eye wash station, the container fill station, and the ice delivery chute are mounted on a first side of the transportable climate-controlled, enclosed environment, and the water inlet and a potable water outlet are mounted on a second side of the transportable climate-controlled, enclosed environment.

23. The water treatment system of claim 20, further comprising: an electrical power connection that is mounted on an exterior of the transportable climate-controlled, enclosed environment for access from outside the transportable climate-controlled, enclosed environment.

24. The water treatment system of claim 1, further comprising: an ozone generator configured to oxidize iron and manganese present in the water from the water inlet and reduce an organic load of the water.

25. The water treatment system of claim 1, wherein the water treatment system is configured to meet a water demand of about 6,000 gallons per day.

26. The water treatment system of claim 1, wherein the onboard control system is further configured to provide water quality data to the offsite location.

27. The water treatment system of claim 26, wherein the onboard control system is further configured to provide one or more of a chlorination level, a pH measurement, a total dissolved solids measurement, and a volume of a quantity of potable water delivered to the offsite location.

28. The water treatment system of claim 3, wherein the human-machine interface to the onboard control system comprises: a graphical display of the treatment process, warnings, alarms, and shutdown messages.

29. The water treatment system of claim 1, wherein the chlorine monitor and the chlorine injection pump are positioned downstream of the reverse osmosis unit.

30. The water treatment system of claim 1, further comprising: a total-dissolved-solids monitor and a bypass valve that are configured to adjust taste of a quantity of potable water.

31. The water treatment system of claim 1, further comprising: controls to adjust the pH and mineral content of a quantity of potable water.

32. The water treatment system of claim 1, further comprising: controls to adjust the pH and mineral content to adjust taste of a quantity of potable water.

33. The water treatment system of claim 1, wherein the onboard control system comprises a network connection to a router that is configured for communications with the offsite location.

34. The water treatment system of claim 1, further comprising: a pretreatment subsystem configured to oxidize iron present in the water from the water inlet and reduce an organic load of the water from the water inlet.

35. The water treatment system of claim 34, wherein the pretreatment subsystem comprises an ozonation unit.

36. The water treatment system of claim 1, further comprising: a five-micron filter system connected downstream of the filtration subsystem.

* * * * *